US011677934B2

(12) United States Patent
Hu et al.

(10) Patent No.: US 11,677,934 B2
(45) Date of Patent: Jun. 13, 2023

(54) ENCODING AND DECODING VIDEO CONTENT

(71) Applicant: Apple Inc., Cupertino, CA (US)

(72) Inventors: Sudeng Hu, San Jose, CA (US); David L. Biderman, San Jose, CA (US); Christopher M. Garrido, Santa Clara, CA (US); Hsi-Jung Wu, San Jose, CA (US); Xiaosong Zhou, Campbell, CA (US); Dazhong Zhang, Saratoga, CA (US); Jinbo Qiu, San Jose, CA (US); Karthick Santhanam, Campbell, CA (US); Hang Yuan, San Jose, CA (US); Joshua L. Hare, Sunnyvale, CA (US); Luciano M. Verger, San Jose, CA (US); Kevin Arthur Robertson, Sunnyvale, CA (US); Sasanka Vemuri, Pleasanton, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/485,298

(22) Filed: Sep. 24, 2021

(65) Prior Publication Data
US 2023/0098082 A1 Mar. 30, 2023

(51) Int. Cl.
*H04N 7/12* (2006.01)
*H04N 19/105* (2014.01)
(Continued)

(52) U.S. Cl.
CPC ......... *H04N 19/105* (2014.11); *H04N 19/124* (2014.11); *H04N 19/146* (2014.11); *H04N 19/172* (2014.11); *H04N 19/177* (2014.11)

(58) Field of Classification Search
CPC .. H04N 19/105; H04N 19/124; H04N 19/146; H04N 19/172; H04N 19/177
(Continued)

(56) References Cited

U.S. PATENT DOCUMENTS

| 10,021,410 B2 * | 7/2018 | Nishi | H04N 19/423 |
| 2008/0069239 A1 * | 3/2008 | Yan | H04N 19/59 |
| | | | 375/240.21 |

(Continued)

OTHER PUBLICATIONS

Extended European Search Report in European Appln. No. 22195887.9, dated Feb. 10, 2023, 10 pages.
(Continued)

*Primary Examiner* — Gims S Philippe
(74) *Attorney, Agent, or Firm* — Fish & Richardson P.C.

(57) ABSTRACT

In an example method, a system receives a plurality of frames of a video, and generates a data structure representing the video and representing a plurality of temporal layers. Generating the data structure includes: (i) determining a plurality of quality levels for presenting the video, where each of the quality levels corresponds to a different respective sampling period for sampling the frames of the video, (ii) assigning, based on the sampling periods, each of the frames to a respective one of the temporal layers of the data structure, and (iii) indicating, in the data structure, one or more relationships between (a) at least one the frames assigned to at least one of the temporal layers of the data structure, and (b) at least another one of the frames assigned to at least another one of the temporal layers of the data structure. Further, the system outputs the data structure.

33 Claims, 10 Drawing Sheets

(51) Int. Cl.
*H04N 19/177* (2014.01)
*H04N 19/172* (2014.01)
*H04N 19/146* (2014.01)
*H04N 19/124* (2014.01)

(58) Field of Classification Search
USPC .................................................. 375/240.02
See application file for complete search history.

(56) References Cited

U.S. PATENT DOCUMENTS

| | | | |
|---|---|---|---|
| 2008/0165863 A1* | 7/2008 | Yan ........................ | H04N 19/14 375/E7.193 |
| 2010/0220785 A1 | 9/2010 | Alfonso et al. | |
| 2013/0106998 A1* | 5/2013 | Pahalawatta ........... | H04N 19/10 348/43 |
| 2014/0010294 A1* | 1/2014 | Ye .......................... | H04N 19/33 375/240.12 |
| 2014/0205009 A1* | 7/2014 | Rose ...................... | H04N 19/48 375/240.12 |
| 2015/0281709 A1* | 10/2015 | Bracha .................. | H04N 19/65 375/240.26 |
| 2016/0065976 A1* | 3/2016 | He ........................ | H04N 19/187 375/240.12 |
| 2017/0111642 A1* | 4/2017 | Hendry .................. | H04N 19/30 |

OTHER PUBLICATIONS

Li et al., "Frame layer rate control for H.264/AVC with hierarchical B-frames," Image Communication, Mar. 2009, 24(3):177-299.

Su, "A Simplified and Fast Fully Scalable Video Coding Scheme with Hierarchical-B-Picture-Like and DWT," 2009 Asia-Pacific Conference on Information Processing, Jul. 2018, 2(1):205-209.

Zhou et al., "Temporal Correlation based Hierarchical Quantization Parameter Determination for HEVC Video Coding," 2017 IEEE International Conference on Image Processing (ICIP), Sep. 2017, 5 pages.

\* cited by examiner

ENCODING AND DECODING VIDEO CONTENT

TECHNICAL FIELD

This disclosure relates generally to encoding and decoding video content.

BACKGROUND

Electronic devices can be used to generate and present video content. As an example, an electronic device can generate a video of a subject, and transmit the video to one or more other electronic devices for presentation. In some implementations, electronic devices can exchange video content in real time (e.g., to facilitate video conferencing or video telephony between them).

SUMMARY

In an aspect, a method includes: receiving, by one or more processors, a plurality of frames of a video; generating, by the one or more processors, a data structure representing the video, where the data structure represents a plurality of temporal layers, and where generating the data structure includes: (i) determining a plurality of quality levels for presenting the video, where each of the quality levels corresponds to a different respective sampling period for sampling the frames of the video, (ii) assigning, based on the sampling periods, each of the frames to a respective one of the temporal layers of the data structure, and (iii) indicating, in the data structure, one or more relationships between (a) at least one the frames assigned to at least one of the temporal layers of the data structure, and (b) at least another one of the frames assigned to at least another one of the temporal layers of the data structure; and outputting, by the one or more processors, the data structure.

Implementations of this aspect can include one or more of the following features.

In some implementations, the data structure can include a group of pictures (GOP) structure.

In some implementations, outputting the data structure can include transmitting a bit stream having the data structure.

In some implementations, the method can further include: generating the video using one or more cameras of a first mobile device, and transmitting the data structure from the first mobile device to one or more second mobile devices via a communications network.

In some implementations, the video can include visual content for a communications session between the first mobile device and the one or more second mobile devices.

In some implementations, assigning each of the frames to the respective one of the temporal layers of the data structure can include, for each of the frames: determining an index number associated with that frame; identifying, from among the quality levels, a particular quality level from among the plurality of quality levels corresponding to a sampling period that is evenly divisible by the index number; and assigning the frame to one of the temporal layers based on the identified quality level.

In some implementations, the frame can be assigned to the temporal layer having a same index value as an index value of the identified quality level.

In some implementations, identifying the particular quality level can include: identifying a subset of the quality levels from among the particular of quality levels, each of the quality levels of the subset corresponding to a respective sampling period that is evenly divisible by the index number; and selecting the quality level from among the subset having the greatest sampling period.

In some implementations, the plurality of quality levels can include: a first quality level corresponding to a first sampling period, and a second quality level corresponding to a second sampling period, where the first sampling period is a multiple of the second sampling period.

In some implementations, the plurality of quality levels can further include a third quality level corresponding to a third sampling period, where the second sampling period is a multiple of the third sampling period.

In some implementations, the method can further include: encoding the frames assigned to a first one of the temporal layers of the data structure according to a first bitrate; and encoding the frames assigned to a second one of the temporal layers of the data structure according to a second bitrate, where the first bitrate is different from the second bitrate.

In some implementations, the method can further include: encoding the frames assigned to a first one of the temporal layers of the data structure according to a first quantization parameter; and encoding the frames assigned to a second one of the temporal layers of the data structure according to a second quantization parameter, where the first quantization parameter is different from the second quantization parameter.

Other implementations are directed to systems, devices, and non-transitory, computer-readable media having instructions stored thereon, that when executed by one or more processors, causes the one or more processors to perform operations described herein.

The details of one or more embodiments are set forth in the accompanying drawings and the description below. Other features and advantages will be apparent from the description and drawings, and from the claims.

DETAILED DESCRIPTION

Figure 1:
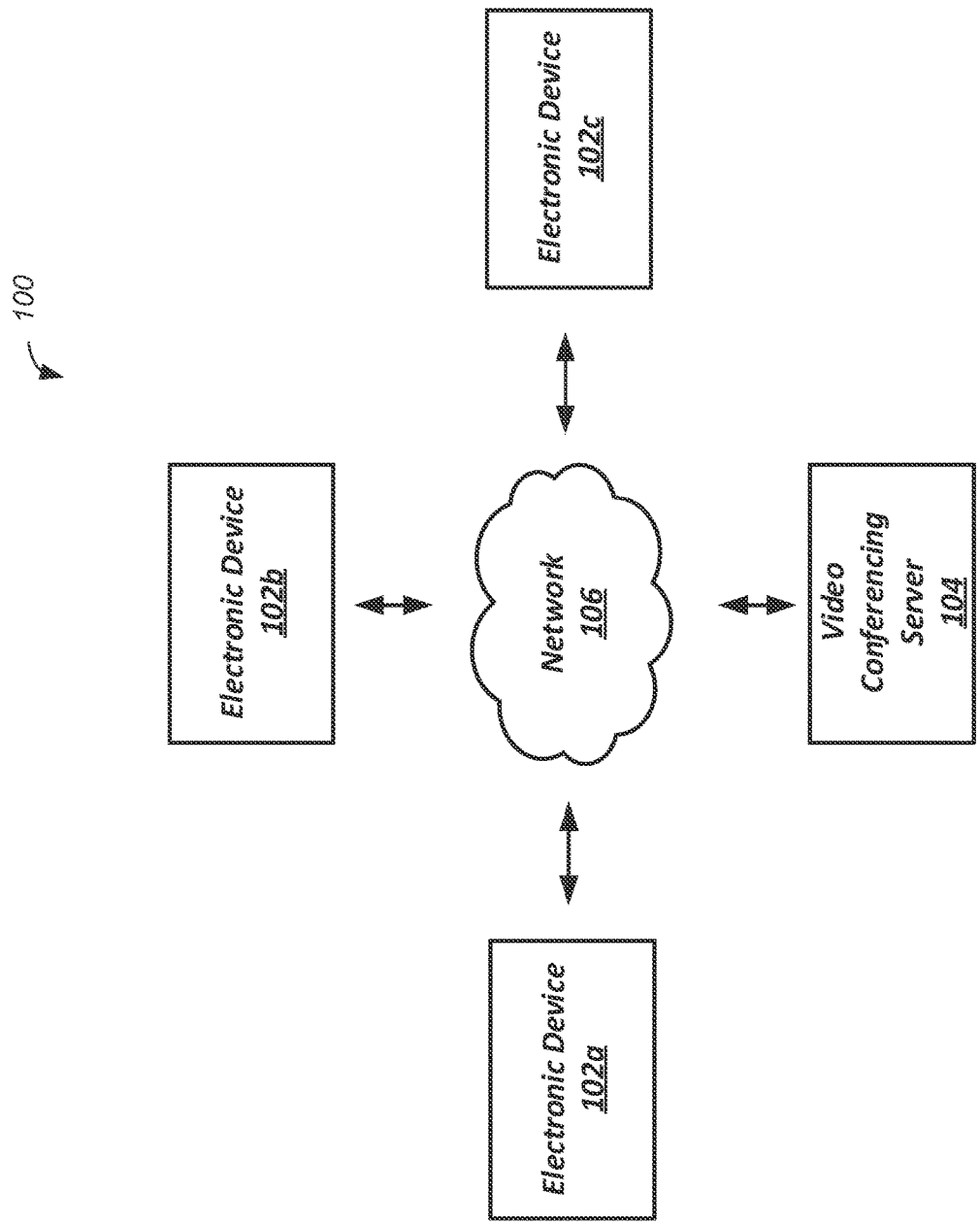
FIG. 1 is a diagram for exchanging video content between users.

In general, electronic devices can generate video content and present the video content to one or more users. As an example, a first electronic device can generate a video of a subject (e.g., containing synchronized audio content and visual content regarding the subject), encode information regarding the video in a data structure, and transmit the data structure to one or more second electronic devices. Each of the second electronic devices can decode the data structure to extract information regarding the video, and present the video (or an approximation thereof) to one or more users.

Further, in some implementations, electronic devices can exchange video content in real time, such as to facilitate video conferencing or video telephony between them. As an example two or more electronic devices can be communicatively coupled to one another (e.g., via a communications network). Further, each of the electronic devices can generate a video of a user of that electronic device, encode information regarding the video, and transmit the data structure to each of the other electronic devices in real time. Concurrently, each of the electronic devices can also receive data structures from each of the other electronic devices, decode the data structures to extract information regarding videos of other users, and present the videos to its user in real time. Accordingly, multiple users can communicate with one another through the real-time exchange of video content.

In some implementations, an electronic device can dynamically adjust the encoding of video content, depending on the complexity of the video content, the capabilities of the communication network, and/or the capabilities of one or more of the other electronic devices. This can be beneficial, for example, in enabling the electronic devices to exchange video content in real time, despite differences or fluctuations in the complexity of the video content, the capabilities of the communication network, and/or the capabilities of the electronic devices.

As an example if the video content is complex (e.g., requiring a large amount of data to encode a representation of the video content), an electronic device can allot a greater amount of computation resources to encode that video content (e.g., a higher encoding bitrate), such that the video content can be presented according to a higher degree of fidelity or detail.

Further, if the video content is not complex (e.g., requiring a small amount of data to encode a representation of the video content), an electronic device can allot a smaller amount of computational resource to encode that video content (e.g., a lower encoding bitrate), such that the computation resources can be conversed.

As another example, if the communication network only enables data to be exchanged between the computer systems according to a low throughput, an electronic device can encode video according to a low quality level (e.g., to produce a data structure having a small data size). This enables the encoded video content to be transmitted over the communications network, decoded by the recipient electronic device, and presented by the recipient electronic device in real time, without exceeding the capabilities of the communications network.

Further, if the communication network enables data to be exchanged between the electronic devices according to a high throughput, an electronic device can encode video according to a high quality level (e.g., to produce a data structure having a larger data size). This enables a high quality version of the encoded video content (e.g., having a higher level of fidelity and/or detail) to be transmitted over the communications network, decoded by the recipient electronic device, and presented by the recipient electronic device in real time.

As another example, if the technical capabilities of a recipient electronic device are low (e.g., having a slow processor, limited memory, etc.), an electronic device can encode video according to a low quality level (e.g., to produce a data structure that is less computationally demanding to decode). This enables the encoded video content to be transmitted over the communications network, decoded by the recipient electronic device, and presented by the recipient electronic device in real time, without exceeding the capabilities of the recipient electronic device.

Further, if the technical capabilities of a recipient electronic device are high (e.g., having a fast processor, larger memory, etc.), an electronic device system can encode video according to a high quality level (e.g., to produce a data structure that is more computationally demanding to decode). This enables a high quality version of the encoded video content to be transmitted over the communications network, decoded by the recipient electronic device, and presented by the recipient electronic device in real time.

Example techniques for dynamically adjusting the encoding of video content are described in further detail below.

An example system 100 for exchanging video content between electronic devices is show in FIG. 1. In some implementations, the system 100 can be configured to enable video conferencing or video telephony between two or more users of the electronic devices.

The system 100 includes several electronic devices 102*a*-102*c* and a video conferencing server 104 communicatively coupled to one another via a communications network 106. During an example operation of the system 100, the electronic devices 102*a*-102*c* establish one or more communications sessions using the communications network 106, and exchange video content with one another (e.g., in real time).

In some implementations, the electronic devices 102*a*-102*c* can establish a communications session directly with one another. As an example, the electronic devices 102*a*-102*c* can establish one or more communications links directly between one another over the communications network 106. Further, each of the electronic devices 102*a*-102*c* can generate video content, and transmit the video content to one or more of the other electronic devices 102*a*-102*c* directly via the communications link. Further, each of the electronic devices 102*a*-102*c* can receive video content from one or more of the other electronic devices 102*a*-102*c* directly via the communications links, and present the video content to a user.

In some implementations, the electronic devices 102*a*-102*c* establish a communications session with one another using the video conferencing server 104 as an intermediary. As an example, each of the electronic devices 102*a*-102*c* can establish a communications link with the video conferencing server over the communications network 106. Further, each of the electronic devices 102*a*-102*c* can generate video content, and transmit the video content to the video conferencing server 104 via the communications links. The video conferencing server 104 can receive the video content from each of the electronic devices 102*a*-102*c*, and route the video content to each of the other electronic devices 102*a*-102*c* (e.g., such that each electronic device receives video content generated by each other electronic device). In turn, each of the electronic devices 102a-102c can present the received video content to a user.

In practice, the electronic devices 102a-102c can be any devices that are configured to receive, process, and transmit data. As an example, at least one of the electronic devices 102a-102c can be a computing device, such as a client computing device (e.g., a desktop computer or a notebook computer), a server computing device (e.g., a server computer or cloud computing system), a mobile computing device (e.g., a cellular phone, smartphone, a tablet, a personal data assistant, or a notebook computer), a wearable computing device (e.g., a smart watch, a virtual reality headset, or an augmented reality headset), or other computing device capable of receiving, processing, and transmitting data. In some implementations, at least one of the electronic devices 102a-102c can operate using one or more operating systems (e.g., Apple macOS, Apple iOS, Microsoft Windows, Linux, Unix, Google Android, etc.) and one or more architectures (e.g., x86, PowerPC, ARM, etc.).

Although FIG. 1 shows three example electronic devices 102a-102c, in practice, a system 100 can include any number of electronic device that are configured to exchange video with one another concurrently over a communications network 106 (e.g., two, three, four, five, or more).

Further, in practice, the video conferencing server 104 also can be any device that is configured to receive, process, and transmit data. As an example, the video conferencing server 104 can be a computing device, such as a server computing device (e.g., a server computer or cloud computing system). In some implementations, the video conferencing server 104 can operate using one or more operating systems (e.g., Apple macOS, Apple iOS, Microsoft Windows, Linux, Unix, Google Android, etc.) and one or more architectures (e.g., x86, PowerPC, ARM, etc.).

The communications network 106 can be any communications networks through which data can be transferred and shared. For example, the communications network 106 can be a local area network (LAN) or a wide-area network (WAN), such as the Internet. The communications network 106 can be implemented using various networking interfaces, for instance wireless networking interfaces (e.g., Wi-Fi, Bluetooth, or infrared) or wired networking interfaces (e.g., Ethernet or serial connection). The communications network 106 also can include combinations of more than one network, and can be implemented using one or more networking interfaces.

Figure 2:
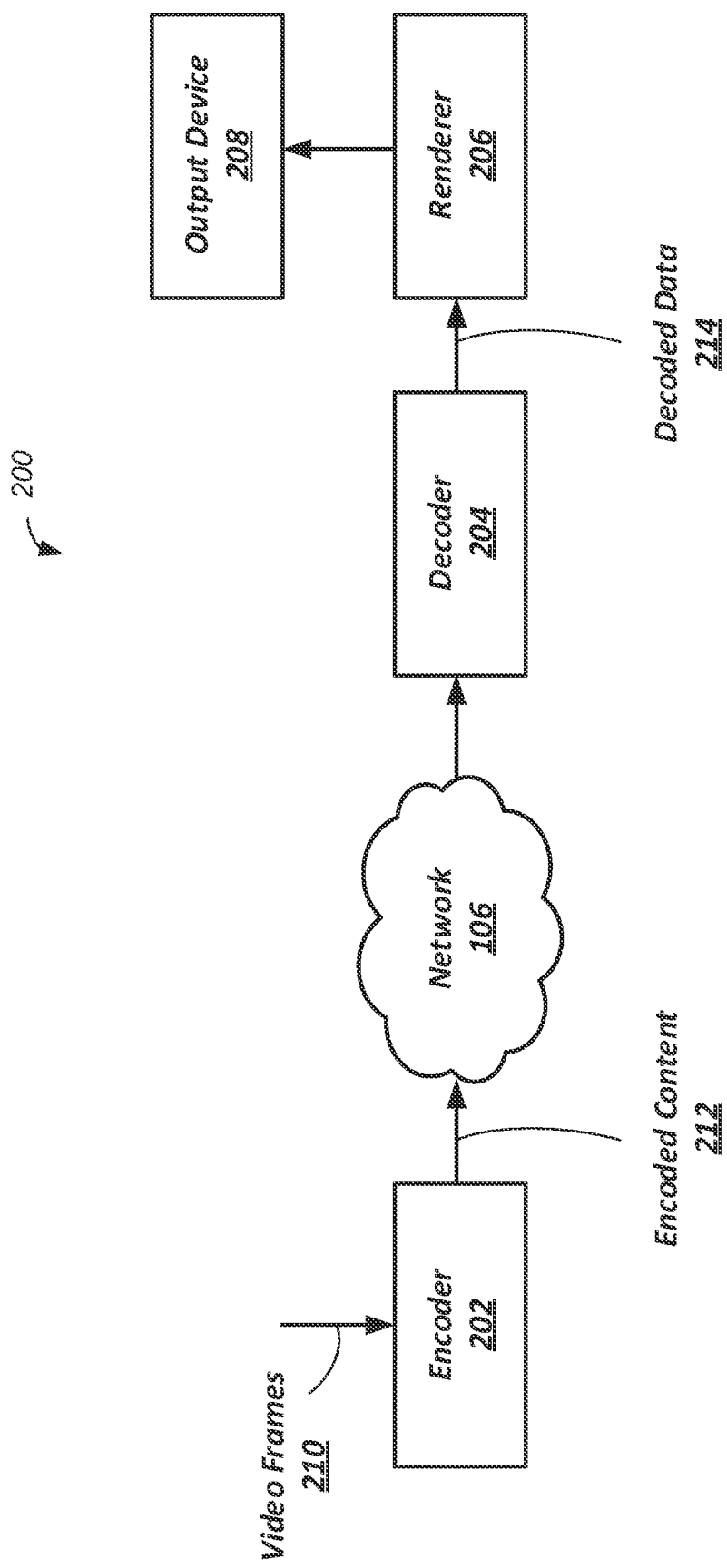
FIG. 2 is a diagram of an example system for encoding and decoding video content.

FIG. 2 is a diagram of an example system 200 for processing and displaying video content. The system 100 includes an encoder 202, a decoder 204, a renderer 206, and an output device 208.

In some implementations, the system 200 can be implemented, at least in part, using the system 100. As an example, each of the electronic devices 102a-102c can include a respective encoder 202 (e.g., for encoding video content to be exchanged with other electronic devices). As another example, each of the electronic devices 102a-102c can include a respective decoder 206, renderer 206, and output device 208 (e.g., for decoding, rendering and presenting video content received from other electronic devices).

During an example operation of the system 200, the encoder 202 receives several sequential video frames 210 of a video. In some implementations, the video frames 210 can be provided to the encoder 202 in real time. For example, a camera subsystem of an electronic device can generate the video frames 210 continuously (e.g., during a communications session, such as a video conferencing session or video telephony session), and provide the video frames 210 as they are captured to the encoder 202.

In some implementations, each of the video frames 210 can include a two-dimensional and/or three dimensional image (or a portion thereof), each representing a particular portion of the video. As an example, each of the video frames 210 can include an image that was captured at a particular point in time (e.g., by the camera subsystem of an electronic device). Further, the video frames 210 can be presented sequentially (e.g., in the order in which they were captured) to indicate dynamic visual information, such as the movement or other changes in the subjects of the images over time.

In some implementations, the video frames 210 can captured according to a particular frame rate and/or bitrate. As an example, the video frames 210 include images that are captured sequentially at a frequency of $f_{capture}$ (e.g., each images is separated in time by a time interval $1/f_{capture}$) and according to a bitrate of $BR_{capture}$.

Figure 3A:
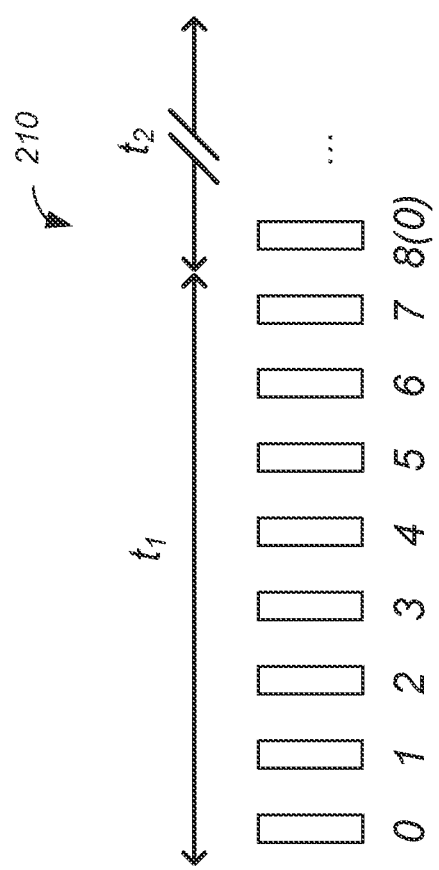
FIG. 3A is a diagram of an example set of video frames

An example set of video frames 210 is shown in FIG. 3A. In this example, a set of eight video frames (labeled "0" to "7") were captured over a time interval $t_1$, corresponding to a frame rate $f_{capture}$ of $8*t_1$. Additional sets of video frames also be captured after the time interval $t_1$ (e.g., another set of eight video frames, beginning from a frame "8 (0)," over a time interval $t_2$).

The encoder 202 generates encoded content 212 based on the video frames 210. The encoded content 212 includes information that enables an electronic device to generate video content representing the video frames 210. As an example, the encoded content 212 can include a data structure including a representation of one or more of the video frames 210. Further, the data structure can include information regarding the relationship between at least some of the video frames 210, such as the order in which the video frames 210 are to be presented in a sequence and/or one or more prediction vectors between the video frames 210.

Figure 3B:
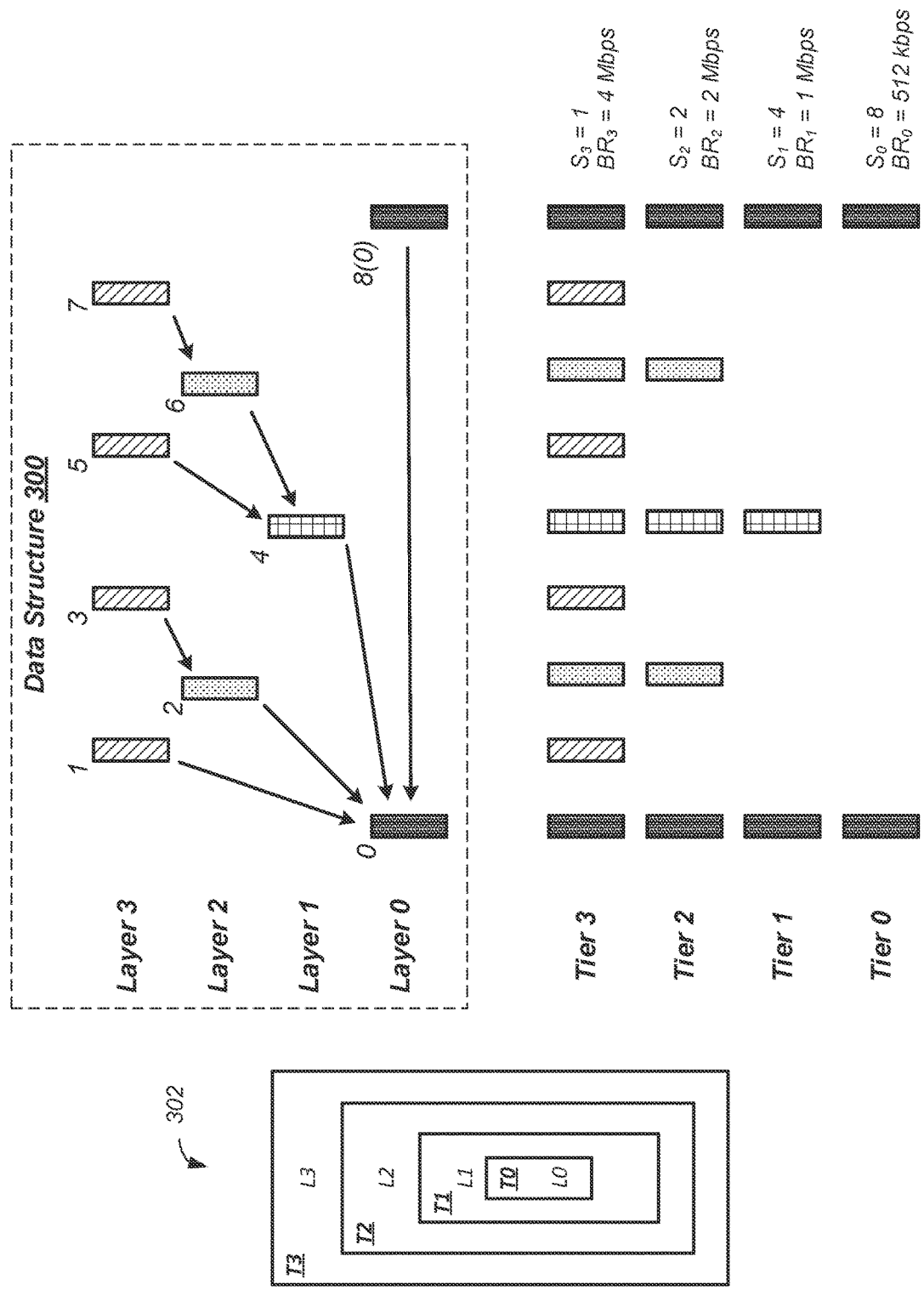
FIG. 3B is a diagram of an example data structure for encoding information regarding the video frames, and a schematic depicting a relationship between the temporal layers of the data structure and corresponding quality levels or tiers for presenting video content.

FIG. 3B shows an example data structure 300 for encoding information regarding the video frames 210. In some implementations, the data structure 300 may be referred to as a group of pictures (GOP) structure.

In general, the data structure 300 can assign each of the video frames 210 to one of several temporal layers, in accordance with different quality levels or "tiers." As an example, a high quality level can correspond to a presentation of video content according to a high level of fidelity and/or detail, whereas a low quality level can corresponding to a presentation of the video content according to a low level of fidelity and/or detail.

In some implementations, each of the quality levels or tiers can be associated with a respective bitrate for transmitting and/or receiving video content. As an example, a high quality level can be associated with a high bitrate (e.g., such that a large amount of data can be transmitted and/or received for presenting video content), whereas a lower quality level can be associated with a low bitrate (e.g., such that a small amount of data can be transmitted and/or received for presenting video content). \

For instance, in the example shown in FIG. 3B, the quality level "Tier 0" can be associated with a bitrate $BR_0=512$ kbps, the quality level "Tier 1" can be associated with a bitrate $BR_1=1$ Mbps, the quality level "Tier 2" can be associated with a bitrate $BR_2=2$ Mbps, and the quality level "Tier 3" can be associated with a bitrate $BR_1=4$ Mbps. In practice, each of the tiers can be associated with any other bitrate, depending on the implementation.

In some implementations, a high quality level can correspond, at least in part, to a high frame rate for presenting the video content, whereas a low quality level can correspond, at least in part, to a low frame rate for presenting the video content. Further, the data structure 300 can be arranged according a sets of temporal layers that provide increasing temporal resolution for the video content. In some implementations, this technique may be referred to as temporal scaling.

For instance, in the example shown in FIG. 3B, the data structure 300 can be used to generate video content according to a low quality level ("Tier 0") in which one out of every eight of the captured video frames are presented (e.g., corresponding to a framerate of $f_{capture}/8$. As another example, the data structure 300 can be used to generate video content according to a higher quality level ("Tier 1") in which one out of every four of the captured video frames are presented (e.g., corresponding to a framerate of $f_{capture}/4$. As another example, data structure 300 can be used to generate video content according to an even higher quality level ("Tier 2") in which one out of every two of the captured video frames are presented (e.g., corresponding to a framerate of $f_{capture}/2$. As another example, the data structure 300 can be used to generate video content according to an even higher quality level ("Tier 3") in which every one of the captured video frames are presented (e.g., corresponding to a framerate of $f_{capture}$).

Each of the quality levels or tiers can be associated with a respective temporal layer of the data structure 300. Further, each of the video frames 210 can be assigned to a particular one of the temporal layers, depending on whether that video frame would be presented in video content having the corresponding quality level.

As an example, as shown in the schematic 302, the quality level "Tier 0" can include each of the frames that have been assigned to the temporal layer "Layer 0." Further, the quality level "Tier 1" can include each of the frames that have been assigned to the temporal layer "Layer 1," as well as each of the frames of the lower quality levels (e.g., "Tier 0"). Further, the quality level "Tier 2" can include each of the frames that have been assigned to the temporal layer "Layer 2," as well as each of the frames of the lower quality levels (e.g., "Tier 1" and "Tier 0"). Further, the quality level "Tier 3" can include each of the frames that have been assigned to the temporal layer "Layer 3," as well as each of the frames of the lower quality levels (e.g., "Tier 2," "Tier 1," and "Tier 0").

The video frames 210 can be assigned to a particular temporal layer of the data structure 300 in accordance with the schematic 302. For example, the video frames "0" and "8(0)" would be presented in video content according to each of the quality levels or tiers. Accordingly, the video frames "0" and "8(0)" can be assigned to the lowest temporal layer "Layer 0."

As another example, the video frame "4" would be presented in video content according to each of the quality levels "Tier 1" through "Tier 3" only. Accordingly, the video frame "4" can be assigned to the temporal layer "Layer 1."

As another example, the video frames "2" and "6" would be presented in video content according to each of the quality levels "Tier 2" and "Tier 3" only. Accordingly, the video frames "2" and "6" can be assigned to the temporal layer "Layer 2."

As another example, the video frames "1," "3," "5" and "7," would be presented in video content according to the quality level "Tier 3" only. Accordingly, the video frames "1," "3," "5" and 7" can be assigned to the temporal layer "Layer 3."

For the purposes numbering video frames in a data structure, each video frame that is assigned to the lowest temporal layer can be assigned an index value of 0, and each subsequent video frame can be assigned the next higher integer (unless that video frame is assigned to the lowest temporal layer, in which it would be assigned an index value of 0).

In some implementations, rather than storing a complete, stand-alone representation of the contents of each of the video frames in the data structure 300, for at least some of the video frames, the encoder 202 can store data representing the changes or "delta" between that video frame and another video frame. This can be beneficial, for example, in reducing the size of the data structure 300 (e.g., by reducing redundancies in the data stored herein).

Further, the encoder 202 can generate the data structure 300 such that the data structure 300 includes one or more prediction vectors indicating a relationship between two or more of the video frames in the data structure 300. For instance, a prediction vector can indicate that the data stored in the data structure 300 regarding a particular video frame represents the changes relative to another video frame stored in the data structure 300 (e.g., a predicted picture or "P-frame"), rather than a stand-alone representation of the contents of a video frame (e.g., an intra-coded picture or "I-frame," or "key frame").

As an illustrative example, in the data structure 300 shown in FIG. 3B, a prediction vector extends from the video frame "2" to the video frame "0" (represented by an arrow). This indicates that the data stored in the data structure 300 regarding the video frame "2" represents only the changes between the video frame "2" and the video frame "0" (e.g., rather than a stand-alone representation of the contents video frame "2"). Accordingly, to render the video frame "2," a decoder would obtain the video frame "0," and modify the contents of the video frame "0" based on the data contained within the data structure 300 regarding the video frame "2."

As another example, in the data structure 300 shown in FIG. 3B, a prediction vector extends from the video frame "3" to the video frame "2" (represented by another arrow). This indicates that the data stored in the data structure 300 regarding the video frame "3" represents only the changes between the video frame "3" and the video frame "2" (e.g., rather than a stand-alone representation of the contents video frame "3"). Accordingly, to render the video frame "3," a decoder would (i) obtain the video frame "0," (ii) modify the contents of the video frame "0" based on the data contained within the data structure 300 regarding the video frame "2" to obtain the video frame "2," and (iii) modify the contents of the video frame "2" based on the data contained within the data structure 300 regarding the video frame "3" to obtain the video frame "3."

The decoder can perform a similar technique to obtain each of the other video frames represented by the data structure 300.

FIG. 3B shows an example data structure 300 having four temporal layers corresponding to four quality levels or tiers. However, in practice, a data structure 300 can include any number of temporal layers corresponding to any number of quality levels or tiers (e.g., one, two, three, four, or more). Further, although example frame rates are shown in FIG. 3B, in practice, a quality level or tier can correspond to any frame rate that is greater than or equal to that of the next lower quality level or tier. Further, in some implementations, the frame rate of each quality level or tier can be a multiple of the frame rate of the next lower quality level or tier.

In some implementations, the encoder 202 can assign the video frames 210 to the temporal layers of the data structure 300 based on (i) index numbers associated with each of the video frames 210, and (ii) the sampling periods associated with each of the quality levels or tiers.

As an example, each of the video frames 210 can be assigned an integer index number i starting from 0 (e.g., for the first video frame in the data structure 300), and incrementing by 1 for each successive video frame in the data structure 300 in the sequence. As described above, in some implementations, each video frame that is assigned to the lowest temporal layer can be assigned an index value of 0, and each subsequent video frame can be assigned the next higher integer (unless that video frame is assigned to the lowest temporal layer, in which it would be assigned an index value of 0).

Further, a sampling period can be determined for each of the quality levels or tiers. The sampling period for a quality level can correspond to the interval at which the captured video frames are sampled or encoded at that quality level. In some implementations, the sampling period may also be referred to as a sampling frequency, or sampling rate, and/or a sampling interval (depending on the context).

For instance, in the example shown in FIGS. 3A and 3B, the captured set of video frames 210 includes 8 frames over a time interval According to the highest quality level "Tier 3," every one of the captured video frames is sampled or encoded, corresponding to a sampling period $S_3=1$ (e.g., every single video frame is sampled or encoded).

Further, according to the next lower quality level "Tier 2," every second one of the captured video frames is sampled or encoded, corresponding to a sampling period $S_2=2$. In some implementations, the video frames in "Tier 2" can be sub-sampled from the video frames in "Tier 3" (e.g., according to a sub-sampling period of 2).

Further, according to the next lower quality level "Tier 1," every fourth one of the captured video frames is sampled or encoded, corresponding to a sampling period $S_1=4$. In some implementations, the video frames in "Tier 1" can be sub-sampled from the video frames in "Tier 2" (e.g., according to a sub-sampling period of 2).

Further, according to the lowest quality level "Tier 0," every eighth one of the captured video frames is sampled or encoded, corresponding to a sampling period $S_0=8$. In some implementations, the video frames in "Tier 0" can be sub-sampled from the video frames in "Tier 1" (e.g., according to a sub-sampling period of 2).

For the ith frame in the data structure 300, the encoder 202 can determine the maximum value among $S_N$, $S_{N-1}$, $S_{N-2}$, . . . , $S_0$ that can evenly divide i, and assign the frame of the temporal layer corresponding to the quality level or tier having that sampling period.

For instance, in the example shown in FIGS. 3A and 3B, for video frame "0," 0 can be evenly divided by each of $S_0$, $S_1$, $S_2$, and $S_3$ (8, 4, 2, and 1, respectively). Accordingly, the video frame "0" can be assigned to temporal layer "Layer 0," corresponding to the quality level "Tier 0" having a sampling period of 8.

As another example, in the example shown in FIGS. 3A and 3B, for video frame "4," 4 can be evenly divided by each of $S_1$, $S_2$, and $S_3$ (4, 2, and 1, respectively). Accordingly, the video frame "4" can be assigned to temporal layer "Layer 1," corresponding to the quality level "Tier 1" having a sampling period of 4.

As another example, in the example shown in FIGS. 3A and 3B, for video frames "2" and "6," both 2 and 6 can be evenly divided by each of $S_2$ and $S_3$ (2 and 1, respectively). Accordingly, the video frames "2" and "6" can be assigned to temporal layer "Layer 2," corresponding to the quality level "Tier 2" having a sampling period of 2.

As another example, in the example shown in FIGS. 3A and 3B, for video frames "1," "3," "5," and "7," each of 1, 3, 5, and 7 can be evenly divided by $S_3$ (1) only. Accordingly, the video frames "1," "3," 5," and "7" can be assigned to temporal layer "Layer 3," corresponding to the quality level "Tier 3" having a sampling period of 1.

In some implementations, the encoder 202 can encode data in the data structure 300 differently, depending on the temporal layer in which the data is stored. As an example, the encoder 202 can encode data assigned to one of the temporal layers according to a particular bitrate, and encode data assigned to one another of the temporal layers according to a different bitrate. This can be beneficial, for example, as data stored in different temporal layers may have different complexities. Accordingly, data that is more complex (e.g., having a greater degree of change between successive video frames) can be encoded using a higher bitrate, whereas data that is less complex (e.g., having a smaller degree of change between successive video frames) can be encoded using a lower bitrate, such that computational resources are distributed appropriately between them. In some implementations, this technique enables a decoder 204 and renderer 206 to generate video content having a consistent degree of quality over time, while also maintaining a consistent bitrate for each quality level or tier.

In some implementations, data in the data structure 300 can be enabled according to one or more quantization parameter (QP) values. A quantization parameter value refers to the degree to which a range of values is quantized or compressed to a single quantum value during an encoding process. For example, a large quantization parameter value can indicate that a large range of values in the data is compressed into a particular quantum value during an encoding process, which may reduce the size of greatly data at the expense of fidelity. As another example, a small quantization parameter value can indicate that a small range of values in the data is compressed into a particular quantum value, which may reduce the size of data more moderately with a lesser impact on fidelity.

In some implementations, the encoder 202 can generate a model for each temporal layer that determines a relationship between (i) the bitrate at which the data of that temporal layer is encoded, and (ii) the quantization parameter value that is used to encode that data (e.g., a "rate-QP model"). The model can account for various characterization of the data in that temporal layer, such as the number of video frames in that temporal layer, the type of data that is stored in the data structure 300 regarding those video frames (e.g., whether the data represents I-frames or P-frames), the complexity of the content (e.g., the level of visual detail in the video frames, the degree of which the contents of the video frames change over time, etc.). Further, the encoder 202 can select a quantization parameter value for each temporal layer, such that the bitrate of each of the quality levels or tiers is consistent with its assigned bitrate.

In some implementations, the encoder 202 can allot a greater number of bits to encode video frames in a lower layer, and a lesser number of bits to encode video frames in a higher layer. This can be beneficial as video frames in the lower layer may consume more bits to achieve the same quality as video frames in a higher layer. For example, the temporal separation between video frames in higher layers is smaller. Accordingly, the content of those video frames are more likely to be similar to one another, and would likely require a fewer number of bits to encode. In contrast, the temporal separation between video frames in lower layers is larger. Accordingly, the content of those video frames are less likely to be similar to one another, and would likely require a greater number of bits to encode.

In some implementations, the encoder 202 can modify the data structure 300 to accommodate differences or fluctuations in the properties of the video content.

As an example, if a portion of video content decreases in complexity, the encoder 202 may require fewer bits to encode that portion of video content. In response, the encoder 202 can modify the arrangement of the data structure 300, such that the frame rate one or more of the quality levels or tiers is increased, while also ensuring that the bitrate does not exceed the assigned bitrate for the quality levels or tiers. This can be beneficial, for example, in providing higher quality video content to a recipient (e.g., video content having a higher framerate), while maintaining a consistent bitrate over time.

Figure 4:
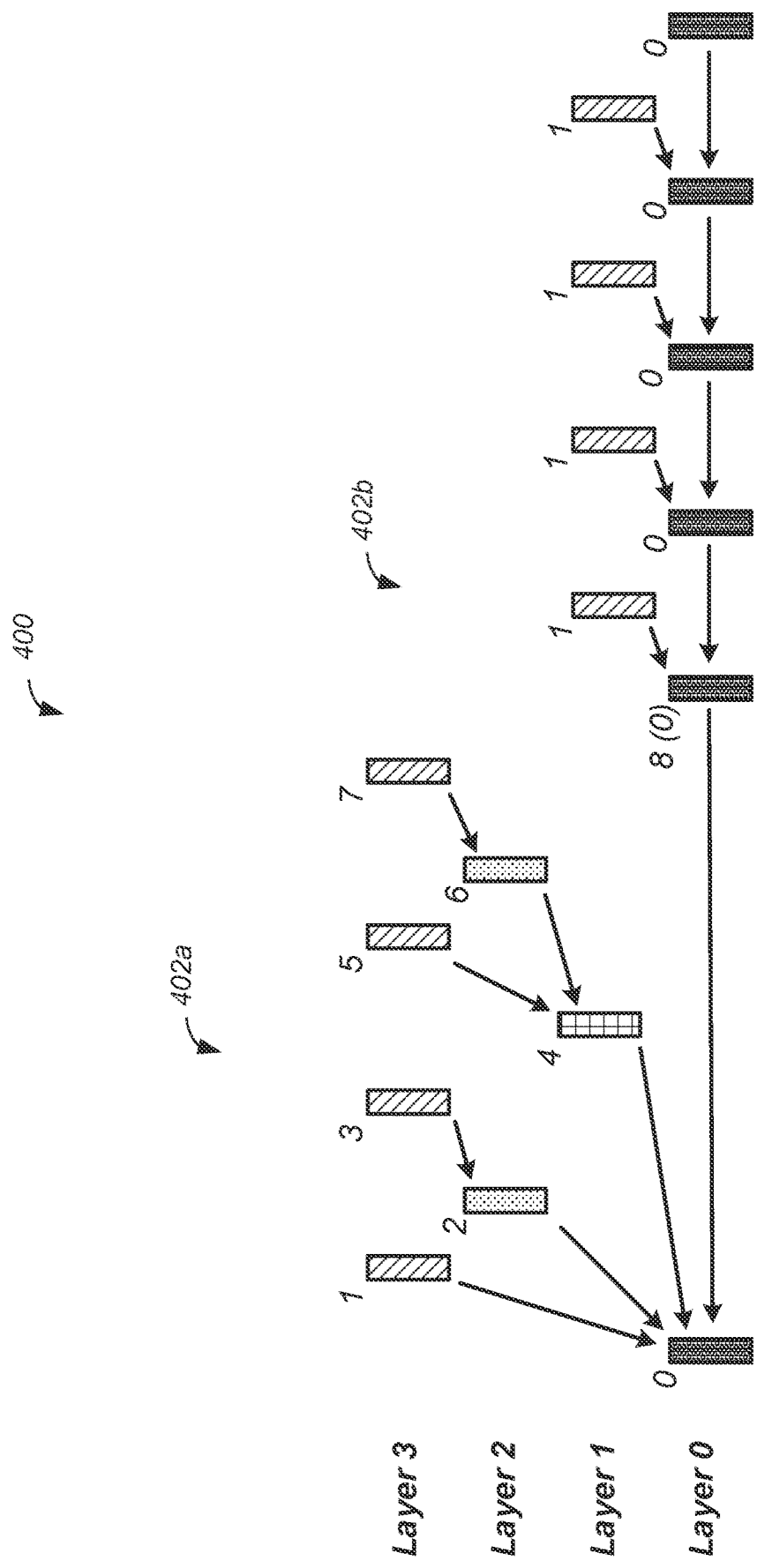
FIG. 4 is a diagram of an example process for modifying a data structure to increase the frame rate for presenting video content according to one or more service levels or tiers.

As an illustrative example, FIG. 4 shows a data structure 400 having a first portion 402a with several video frames "0" to "7," each assigned to one of several temporal layers "Layer 0" to "Layer 3." The portion 402a of the data structure 400 can be similar to that shown in FIG. 3.

As described with reference to FIG. 3B, this arrangement corresponds to a quality level "Tier 3" having a sampling period of $S_3=1$ (e.g., every video frame of the originally captured video is sampled), a quality level "Tier 2" having a sampling period of $S_2=2$ (e.g., every second video frame of the captured video is sampled), a quality level "Tier 1" having a sampling period of $S_1=4$ (e.g., every fourth video frame of the originally captured video is sampled), and a quality level "Tier 0" having a sampling period of $S_0=8$ (e.g., every eighth video frame of the originally captured video is sampled), In this example, the portion 402b following the portion 402a represents a decrease in the complexity of the video content (e.g., compared to that of the portion 402a). If the portion 402b were to be encoded according to the same data structure as the portion 402a, this would result in bitrates for one or more of the corresponding quality levels or tiers that are less than the assigned bitrates for those quality levels or tiers (e.g., the encoder 202 can allot a greater number of bits for encoding of the video frames without exceeding the assigned bitrates for the quality levels or tiers).

In response, beginning with the first video frame in the portion 402b (e.g., the video frame "8(0)"), the encoder 202 can modify the data structure 400 to increase the frame rates of at least some of the quality levels or tiers. As an example, in the portion 402b, the encoder 202 can assign video frames to lower temporal layers which a greater frequency and/or proportion than in the initial portion 402a, such that for one or more of the quality levels or tiers, video frames are presented at a higher rate in the video content.

For instance, in the example shown in FIG. 4, the sampling period for the lowest quality level ("Tier 0") can be decreased in the portion 402b by assigning at least some of the video frames that previously would have been assigned to the temporal layers "Layer 1" to "Layer 3' to the temporal layer "Layer 0" instead (e.g., resulting in an increased frame rate for the quality level "Tier 0"). Similarly, sampling period for the next lowest quality level ("Tier 1") can be decreased in the portion 402b by assigning at least some of the video frames that previously would have been assigned to the temporal layers "Layer 2" and "Layer 3' to the temporal layer "Layer 1" instead (e.g., resulting in an increased frame rate for the quality level "Tier 1"). In this example, the frame rate of the quality level "Tier 0" increases four-fold (e.g., prior to the modification, every eighth frame was presented, and after the modification, every second frame is presented). Further, in this example, the frame rate of the quality level "Tier 1" also increases four-fold (e.g., prior to the modification, every fourth frame was presented, and after the modification, every frame is presented).

Further, if a portion of video content increases in complexity, the encoder 202 may require more bits to encode that portion of video content, which may exceed the bitrate that is assigned to one or more of the quality levels or tiers. In response, the encoder 202 can modify the arrangement of the data structure 300, such that the frame rate one or more of the quality levels or tiers is reduced, and such that the bitrate does not exceed the assigned bitrate for the quality levels or tiers.

Figure 5:
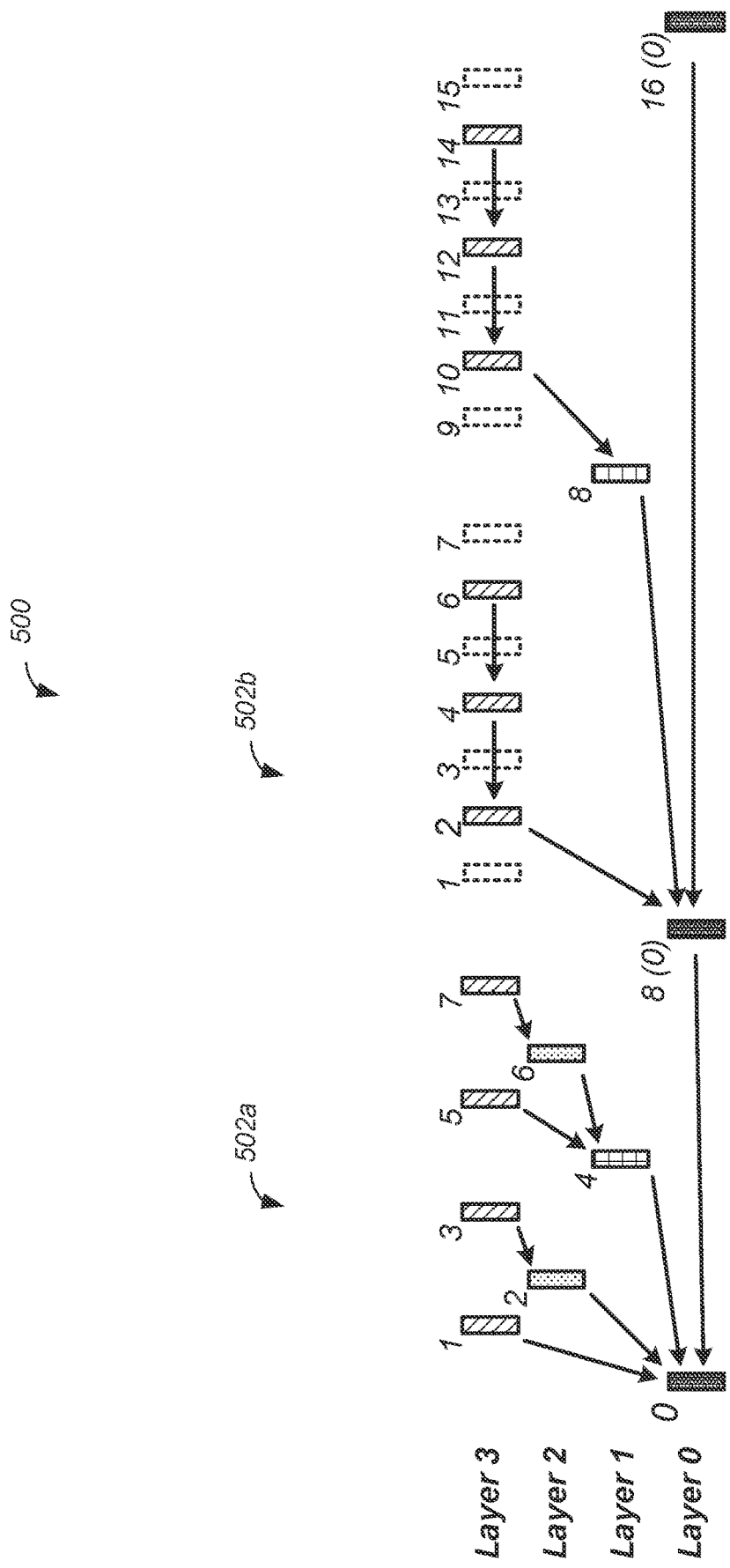
FIG. 5 is a diagram of an example process for modifying a data structure to decrease the frame rate for presenting video content according to one or more service levels or tiers.

As an illustrative example, FIG. 5 shows a data structure 500 having a first portion 502a with several video frames "0" to "7," each assigned to one of several temporal layers "Layer 0" to "Layer 3." The portion 502a of the data structure 500 can be similar to that shown in FIG. 3.

As described with reference to FIG. 3B, this arrangement corresponds to a quality level "Tier 3" having a sampling period of $S_3=1$ (e.g., every video frame of the originally captured video is sampled), a quality level "Tier 2" having a sampling period of $S_2=2$ (e.g., every second video frame of the originally captured video is sampled), a quality level "Tier 1" having a sampling period of $S_1=4$ (e.g., every fourth video frame of the originally captured video is sampled), and a quality level "Tier 0" having a sampling period of $S_0=8$ (e.g., every eighth video frame of the originally captured video is sampled), In this example, the portion 502b following the portion 502a represents an increase in the complexity of the video content (e.g., compared to that of the portion 502a). If the portion 502b were to be encoded according to the same data structure as the portion 502a, this would result in bitrates for one or more of the corresponding quality levels or tiers that are greater than the assigned bitrates for those quality levels of tiers (e.g., the encoder 202 would need to reduce the greater number of bits for encoding of the video frames to avoid exceeding the assigned bitrates).

In response, beginning with the first video frame in the portion 502b (e.g., the video frame "8(0)"), the encoder 202 can modify the data structure 500 to increase the frame rates of one or more of the quality levels or tiers. As an example, in the next portion 502b of the data structure 500, the encoder 202 can assign video frames to higher temporal layers which a greater frequency and/or proportion than in the initial portion 502a, such that for one or more of the quality levels or tiers, video frames are presented at a lower rate in the video content.

For instance, in the example shown in FIG. 5, the sampling period for the lowest quality level ("Tier 0") can be increased in the portion 502b by assigning at least some of the video frames that previously would have been assigned to the temporal layer "Layer 0" to one or more of the temporal layers "Layer 1" to "Layer 3" instead (e.g., resulting in an decreased frame rate for the quality level "Tier 0"). Similarly, sampling period for the next lowest quality level ("Tier 1") can be increased in the portion 502b by assigning at least some of the video frames that previously would have been assigned to the temporal layers "Layer 0" and "Layer 1" to one or more of the temporal layers "Layer 2" or "Layer 3" instead (e.g., resulting in an decreased frame rate for the quality level "Tier 1"). In this example, the frame rate of the quality level "Tier 0" decreases two-fold (e.g., prior to the modification, every eighth frame was presented, and after the modification, every 16$^{th}$ frame is presented). Further, in this example, the frame rate of the quality level "Tier 1" also decreases two-fold (e.g., prior to the modification, every fourth frame was presented, and after the modification, every eighth is presented).

Further, in some implementations, one or more video frames from a temporal layer can be omitted or "dropped" from the data structure. For example, in the example shown in FIG. 5, the sampling period for the quality level "Tier 2" can increased by assigning the video frames "2" and "6" (which previously would have been assigned to the temporal layer "Layer 2") to the temporal layer "Layer 3" instead, resulting in an decreased frame rate for the quality level "Tier 2." Further, the sampling period for the quality level "Tier 3" can increased by omitting or dropping the video frames "1," "3," "5, and "7" (which previously would have been assigned to the temporal layer "Layer 3"), resulting in an decreased frame rate for the quality level "Tier 3."

In some implementations, the encoder 202 can determine whether to modify a data structure periodically or in response to certain conditions. For example, each time that a video frame is assigned to the lowest temporal layer (e.g., "Layer 0"), the encoder 202 can determine whether to maintain the current configuration of the data structure for encoding future video frames (e.g., to maintain the frame rate of each of the corresponding quality levels or tiers), or whether to modify the configuration of the data structure for encoding future frames (e.g., to modify the frame rate of one or more of the corresponding quality levels or tiers).

Referring back to FIG. 2, subsequent to generating the encoded content 212 (e.g., including a data structure encoded using one or more of the techniques described herein), the encoder 202 provides the encoded content 212 to a decoder 204 for processing. In some implementations, the encoded content 212 can be transmitted to the decoder 204 via the network 106 (e.g., as described with reference to FIG. 1).

In some implementations, an electronic device 102a-102c can transmit at least some of the encoded content 212 generated by its encoder 202 directly to another electronic device 102a-102c for decoding, rendering, and output. In some implementations, an electronic device 102a-102c can transmit at least some of the encoded content 212 generated by its encoder 202 to the video conferencing server 104, which in turn can transmit at least some of the encoded content 212 to one or more electronic devices 102a-102c for decoding, rendering, and output.

In some implementations, at least some of the encoded content 212 can transmitted between electronic devices 102a-102c and/or the video conferencing server 104 on a continuous basis and in real time (e.g., to facilitate real time video conferencing or video telephony). For example, at least some of the encoded content 212 can transmitted in real time as a continuous data stream (e.g., a bit stream) between the electronic devices 102a-102c and/or the video conferencing server 104.

In some implementations, an electronic device 102a-102c can generate a single version of the encoded content 212, and transmit instances of the encoded content 212 to other ones of the electronic devices 102a-102c and/or the video conferencing server 104. In some implementations, an electronic device 102a-102c can generate multiple versions of the encoded content 212 (e.g., each corresponding to different quality levels or tiers), and transmit different versions of the encoded content 212 to other ones of the electronic devices 102a-102c and/or the video conferencing server 104. As an example, a first electronic device 102a can selectively transmit a first set of the temporal layers of a data structure to a second electronic device 102b (e.g., to provide video content having a first quality level or tier), and selectively transmit a second set of the temporal layers of the data structure to a third electronic device 102c (e.g., to provide video content having a second quality level or tier).

The decoder 204 receives the encoded content 212, and extracts information regarding at least some of the video frames 210 included in the encoded content 212 (e.g., in the form of decoded data 214). For example, the decoder 106 can extract information regarding at least some of the video frames 210 from the data structure encoded in the encoded content 212, such as the contents of each of the video frames 210 (e.g., colors, textures, visual patterns, opacities, and/or other characteristics of the video frames 210). As another example, the encoder 106 can determine the relationship between at least some of the video frames 210 (e.g., the order of the video frames 210, prediction vectors between the video frames 210, etc.), and use this information to recreate the video frames (or approximations thereof).

In some implementations, the decoder 204 can selectively decode a subset of the encoded content 212, and selectively refrain from decoding other portions of the encoded content 212. For example, the decoder 204 can selectively decode portions of the encoded data structure corresponding to certain temporal layers to obtain video frames (e.g., corresponding to a desired quality level or tier), while selectively refraining from decoding portions of the encoded data structure corresponding to other temporal layers (e.g., corresponding to high quality levels or tiers).

As an example, referring to FIG. 3B, to provide video content having the highest quality level ("Tier 3"), the decoder 204 can decode the data structure 300 to selectively extract video frames from each of the temporal layers "Layer 0" to "Layer 3."

As another example, to provide video content having the next highest quality level ("Tier 2"), the decoder 204 can decode the data structure 300 to selectively extract video frames from each of the temporal layers "Layer 0" to "Layer 2," and refrain from extracting video frames from the temporal layer "Layer 3."

As another example, to provide video content having the next highest quality level ("Tier 1"), the decoder 204 can decode the data structure 300 to selectively extract video frames from each of the temporal layers "Layer 0" and "Layer 1," and refrain from extracting video frames from the temporal layers "Layer 2" and "Layer 3."

As another example, to provide video content having the lowest quality level ("Tier 0"), the decoder 204 can decode the data structure 300 to selectively extract video frames from the temporal layer "Layer 0," and refrain from extracting video frames from the temporal layers "Layer 1" to "Layer 3."

The decoder 204 provides the decoded data 214 to the renderer 206. The renderer 206 renders video content based on the decoded data 214, and presents the rendered content to a user using the output device 208. As an example, if the output device 208 is configured to present content according to two dimensions (e.g., using a flat panel display, such as a liquid crystal display or a light emitting diode display), the renderer 206 can render the video content according to two dimensions and according to a particular perspective, and instruct the output device 208 to display the content accordingly. As another example, if the output device 208 is configured to present content according to three dimensions (e.g., using a holographic display or a headset), the renderer 206 can render the content according to three dimensions and according to a particular perspective, and instruct the output device 208 to display the content accordingly.

In some implementations, the data structures described herein may provide a degree of resiliency against frame loss. For instance, for the example data structure 300 shown in FIG. 3B, if information regarding the video frame "0" were lost (e.g., due to corruption of the data structure), a decoder would need to re-request information regarding the video frame "0" in order to accurately decode the video frames "1" to "7" (e.g., as each of the video frames "1" to "7" depend, at least indirectly, from the video frame "0"). However, if information regarding the video frame "5" were lost, a decoder would still be able to accurately decode each of the other video frames (e.g., as none of the other video frames depend from video frame "5").

The data structure can be encoded in a manner that leverages this resiliency against frame loss. As an example, due to the arrangement of the temporal layers of a data structure, corruption in a lower temporal layer has as high a likelihood of being perceived by a user than corruption in a high temporal layer (e.g., as the loss of a video frame in a lower layer is more likely to result in the loss of further video frames in higher temporal layers, due to the dependencies between them). Accordingly, different degrees of error correction can be applied to each of the temporal layers. This can be beneficial, as the implementation of error correction may carry certain computational and/or network overhead. By selectively applying different degrees of error correction to each temporal layer, the data structure can be made more resilient to error in a resource efficient manner.

As an example, forward error correction (FEC) can be applied to at least some of the temporal layers. Further, the degree of FEC that is applied to each of the temporal layers can be less than the degree of FEC that is applied to the temporal layer below it. For instance, in the example shown in FIG. 3B, 100% FEC can be applied to the temporal layer "Layer 0," 50% FEC can be applied to the temporal layer "Layer 1," 25% FEC can be applied to the temporal layer "Layer 2," and no FEC can be applied to the temporal layer "Layer 3." Although example degrees of FEC are described above, these are merely illustrative examples. In practice, other degrees of FEC can also be used, either in addition to or instead of those described above.

Further, in some implementations, an electronic device 102a-102c can selectively apply error correction to some or all of the temporal layers of a data structure, depending on the intended recipient of the data structure. For example, if a first intended recipient of a data structure is experiencing frame loss, an electronic device 102a-102c can selectively apply error correction to some or all of the temporal layers of a data structure (e.g., corresponding to the video frames that are intended for transmission to the first recipient), and provide at least a portion of the data structure to the first recipient). As another example, if a second intended recipient of a data structure is not experiencing frame loss, an electronic device 102a-102c can selectively refrain from applying error correction to some or all of the temporal layers of a data structure (e.g., corresponding to the video frames that are intended for transmission to the second recipient), and provide at least a portion of the data structure to the second recipient).

In some implementations, a source of encoded content (e.g., an electronic device 102a-102c) can advertise to each of the several recipients of the encoded content (e.g., other ones of the electronic devices 102a-102c) several available quality levels or tiers for receiving the encoded content. Further, the source of encoded content can provide different data structures and/or portions of a data structure based on each of the recipient's selection. As an example, if a recipient selects the highest quality level or tier, the source can encode a data structure having each of the available temporal layers, and transmit the data structure to the recipient. As another example, if another recipient selects a lower quality level or tier, the source can encode a data structure having a subset of the temporal layers (e.g., omitting the highest temporal layer(s)), and transmit the data structure to the recipient.

In some implementations, a source of encoded content can define a set of m of quality levels or tiers, and provide up to n of those quality levels or tiers to one or more recipients concurrently upon request. For example, the source of encoded content that advertise the set of m quality levels or tiers to recipients for selection, and provide encoded content to each of the recipients based on their selections (e.g., by mapping the selected quality levels or tiers to one or more of the quality levels or tiers of the data structures described herein).

In some implementations, recipients may request a number of quality levels or tiers o that is less than or equal to the number of quality levels or tiers n that the source of encoded content that provide concurrently to the recipients. In this case, the source of encoded content to map each of the selected quality levels or tiers to a respective quality level or tier of a data structure, and transmit at least a portion of the data structure to each of the recipients.

As an example, source of encoded content can define a set of seven quality levels or tiers corresponding to bitrates of 512 kbps, 1 Mbps, 2 Mbps, 3 Mbps, 4 Mbps, 5 Mbps, and 6 Mbps. Further, the source of encoded content can provide up to four quality levels or tiers to recipients concurrently. If recipients select four quality levels or tiers (e.g., corresponding to bitrates of 512 kbps, 1 Mbps, 3 Mbps, and 6 Mbps), the source of encoded content to dynamically map each of the selected quality levels to those of a data structure, and transmit at least a portion of the data structure to each of the recipients. For instance, referring to the example shown in FIG. 3B, a 512 kbps bitrate can be mapped to "Tier 0" for the data structure, a 1 Mbps bitrate can be mapped to "Tier 1" for the data structure, a 3 Mbps bitrate can be mapped to "Tier 2" for the data structure, and a 6 Mbps bitrate can be mapped to "Tier 3" for the data structure.

In some implementations, recipients may request a number of quality levels or tiers o that is greater than the number of quality levels or tiers n that the source of encoded content that provide concurrently to the recipients. In this case, the source of encoded content can select a subset of the o quality levels or tiers selected by the recipients (e.g., up to a total of n), map each of the quality levels or tiers in that subset to a respective quality level or tier of a data structure, and transmit at least a portion of the data structure to each of the recipients.

As an example, source of encoded content can define a set of seven quality levels or tiers corresponding to bitrates of 512 kbps, 1 Mbps, 2 Mbps, 3 Mbps, 4 Mbps, 5 Mbps, and 6 Mbps. Further, the source of encoded content can provide up to four quality levels or tiers to recipients concurrently. If recipients select five quality levels or tiers (e.g., corresponding to bitrates of 512 kbps, 1 Mbps, 2 Mbps, 4 Mbps, and 6 Mbps), the source of encoded content to dynamically map four of the selected quality levels to those of a data structure, and transmit at least a portion of the data structure to each of the recipients.

In some implementations, the source of encoded content can dynamically map the n lowest quality levels or tiers selected by the users. For instance, in the example described above, a 512 kbps bitrate can be mapped to "Tier 0" for the data structure, a 1 Mbps bitrate can be mapped to "Tier 1" for the data structure, a 2 Mbps bitrate can be mapped to "Tier 2" for the data structure, and a 4 Mbps bitrate can be mapped to "Tier 3" for the data structure. Further, a 6 Mbps bitrate can be omitted from the quality levels or tiers for the data structure.

Further, the source of encoded content can dynamically change the mapping of the quality levels or tiers for the data structure. As an example, to accommodate higher quality video content, the source of encoded content can dynamically increase a bitrate that is mapped to one or more of the quality levels or tiers (e.g., increase a bitrate that is mapped to "Tier 3" from 4 Mbps to 5 Mbps). As another example, to accommodate lower quality video content, the source of encoded content can dynamically decrease a bitrate that is mapped to one or more of the quality levels or tiers (e.g., decrease a bitrate that is mapped to "Tier 3" from 4 Mbps to 3 Mbps).

Although example sets of quality levels or tiers are described above, these are merely illustrative examples. In practice, any set of quality levels or tiers (e.g., corresponding to any set of corresponding bitrates) can be used, depending on the implementation.

Example Processes

Figure 6:
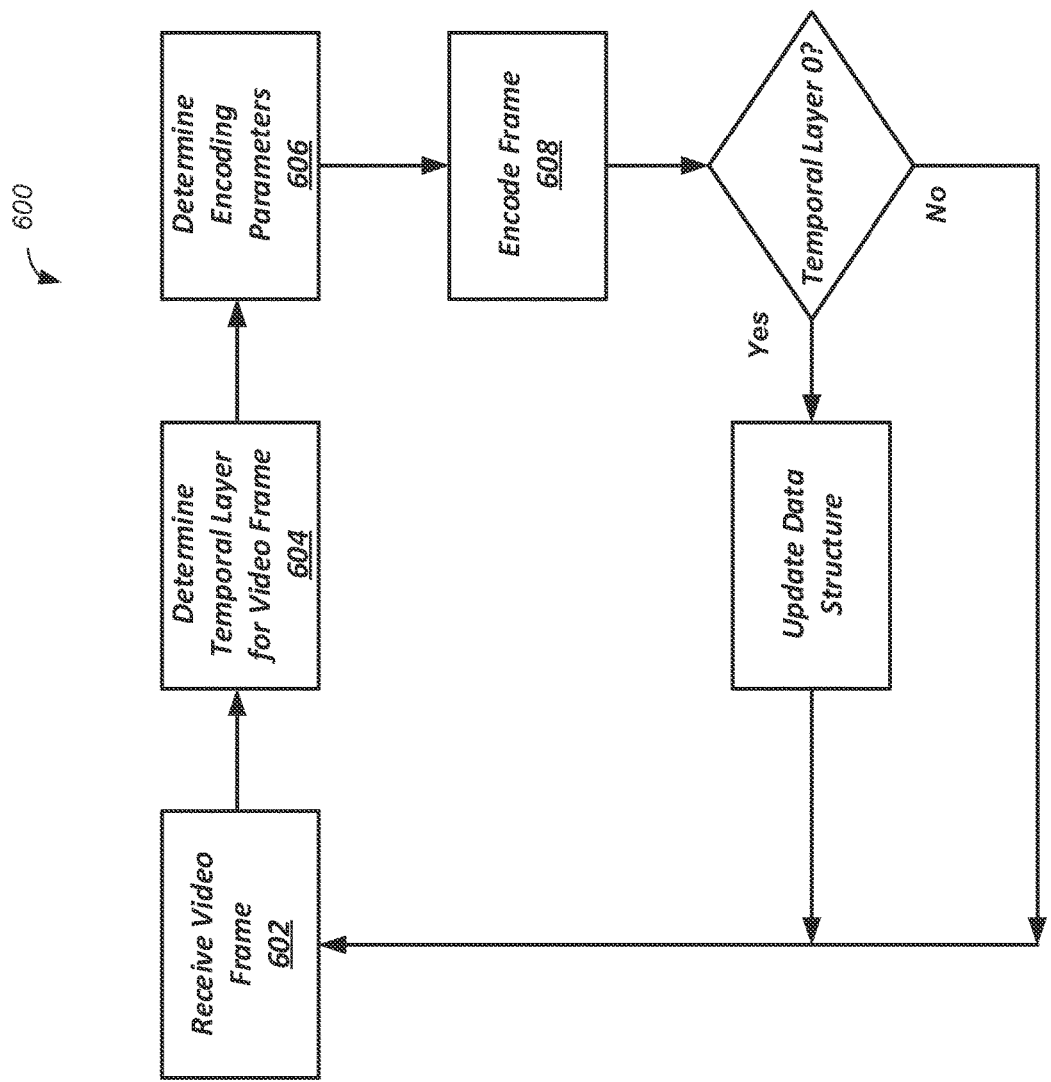
FIG. 6 is flow chart diagram of an example process for encoding data regarding video frames in a data structure.

FIG. 6 shows an example process 600 for encoding data regarding video frames in a data structure using one or more or the techniques described herein. In some implementations, the process 600 can be performed, at least in part, by an encoder 202 (e.g., implemented in one or more of the electronic devices 102*a*-102*c*).

According to the process 600, a system receives a video frame for encoding (block 602). As an example, the video frame can be a frame or image from a video generated by an electronic device (e.g., captured by a camera subsystem of the electronic device during a video conferencing or video telephony session).

The system determines a temporal layer for the received video frame (block 602). Example techniques for selecting a temporal layer for a video frame are described, for example, with reference to FIGS. 3-5. As an example, a temporal layer can be selected based on the order of the video frame in a sequence (e.g., the index number associated with the video frame) and a sampling period of each of several quality levels or tiers, such that a sequence of video frames is presented according to a particular frame rates for each of the quality levels or tiers (e.g., as described above)

Further, system determines encoding parameters for the video frame (block 606). As an example, the system can determine encoding parameters based on the selected temporal layer (e.g., based on a rate-QP model for that temporal layer, as described above).

Further, system encodes the video frame according to the determined encoding parameters (block 608). As an example, the system can store data in a data structure that represents the contents of the video frame, and assign that video frame the determined temporal layer in the data structure.

If the video frame was assigned to the lowest temporal layer (e.g., "Layer 0"), the system determines whether to update the arrangement of the data structure (block 610). As an example, the system can determine whether to modify the arrangement of the data structure to increase the frame rate at which content is presented according to one or more quality levels or tiers (e.g., as described with reference to FIG. 4) or to decrease the frame rate at which content is presented according to one or more quality levels or tiers (e.g., as described with reference to FIG. 5).

The system can repeat the process 600 until no video frames remain (e.g., until the end of a video).

Figure 7:
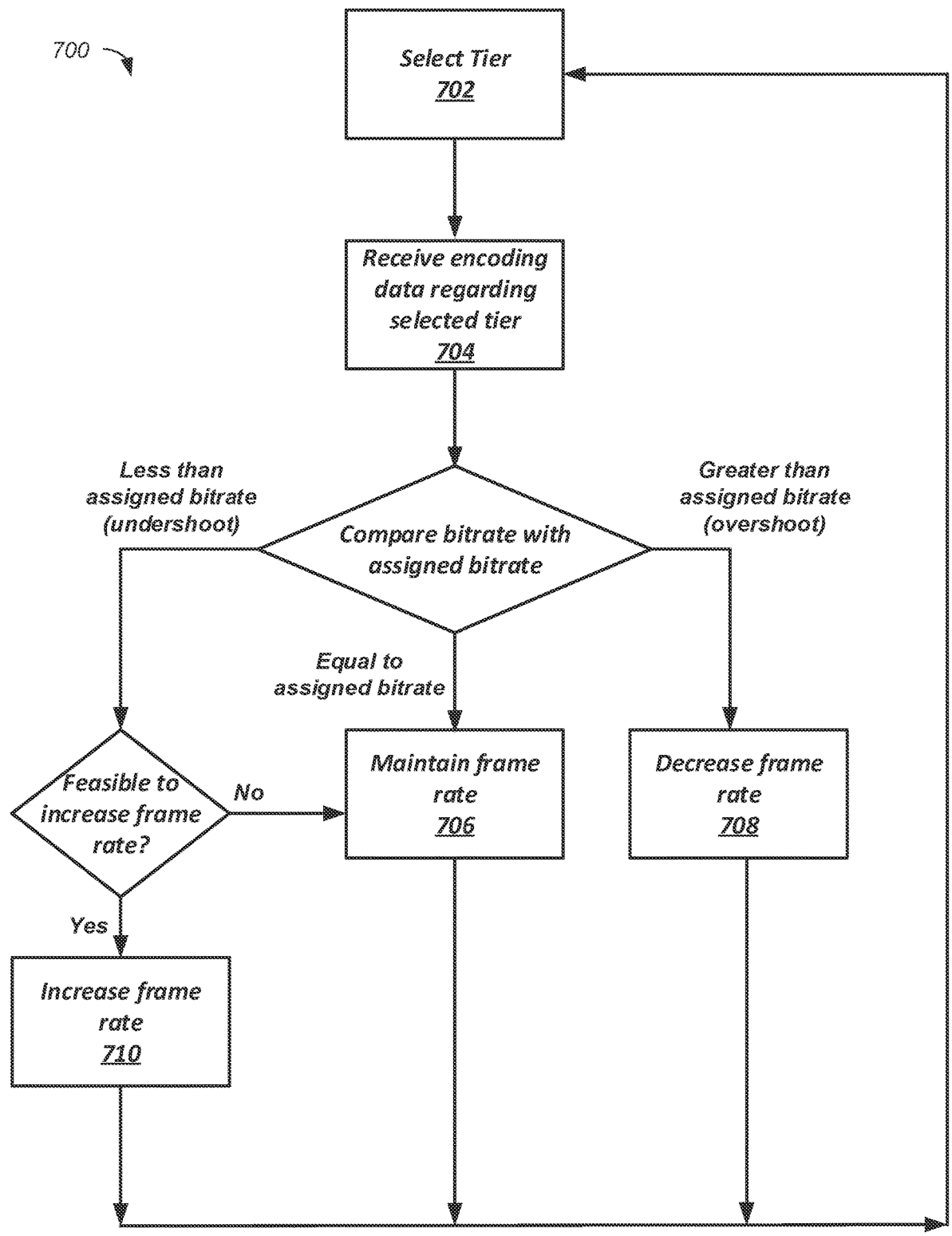
FIG. 7 is flow chart diagram of an example process for modifying a data structure.

FIG. 7 shows an example process 700 for modifying a data structure using one or more or the techniques described herein. In some implementations, the process 700 can be performed, at least in part, by an encoder 202 (e.g., implemented in one or more of the electronic devices 102*a*-102*c*).

According to the process 700, a system selects a quality level or tier for processing (block 702). In some implementations, the system can begin with the second highest quality level or tier, and process each quality level or tier in order until the lowest quality level or tier.

Further, the system receives encoding data regarding the selected tier (block 704). For example, the system can determine the current encoded bitrate of the selected quality level or tier, as well as the bitrate that has been assigned to that quality level or tier (e.g., a target bitrate for that quality level or tier, corresponding to a particular level of service).

If the current encoded bitrate is equal to the assigned bitrate (e.g., within a particular margin of error or allowable range), the system can maintain the frame rate for the quality level or tier (block 706). For example, the system can maintain the same arrangement for the data structure, such that video frames are assigned to each of the temporal layers of the data structure according to the same pattern as before.

If the current encoded bitrate is greater to the assigned bitrate (e.g., greater than a particular margin of error or allowable range), the system can reduce the frame rate for the quality level or tier (block 708). Example techniques for reducing the frame rate for a quality level or tier are described, for example, with reference to FIG. 5.

If the current encoded bitrate is less to the assigned bitrate (e.g., less than a particular margin of error or allowable range), the system can determine whether it is feasible to increase the frame rate for the quality level or tier. If so, the system can increase the frame rate for the quality level or tier (block 710). Otherwise, the system can maintain the frame rate for the quality level or tier (block 706). Example techniques for increasing the frame rate for a quality level or tier are described, for example, with reference to FIG. 4.

In some implementation, the system can determine whether it is feasible to increase the frame rate by determining a bitrate that would be required to encode video frames according to the higher frame rate, and determining whether the new bitrate would exceed the assigned bitrate for that quality level or tier (e.g., exceed a particular margin of error or allowable range). If so, the system can determine that increasing the frame rate is not feasible. Otherwise, the system can determine that increasing the frame rate is feasible.

In some implementation, the system can determine whether it is feasible to increase the frame rate by determining whether increasing the frame rate would exceed the frame rate of the originally captured video. If so, the system can determine that increasing the frame rate is not feasible. Otherwise, the system can determine that increasing the frame rate is feasible.

The system can repeat the process 700 until no tiers remain.

Figure 8:
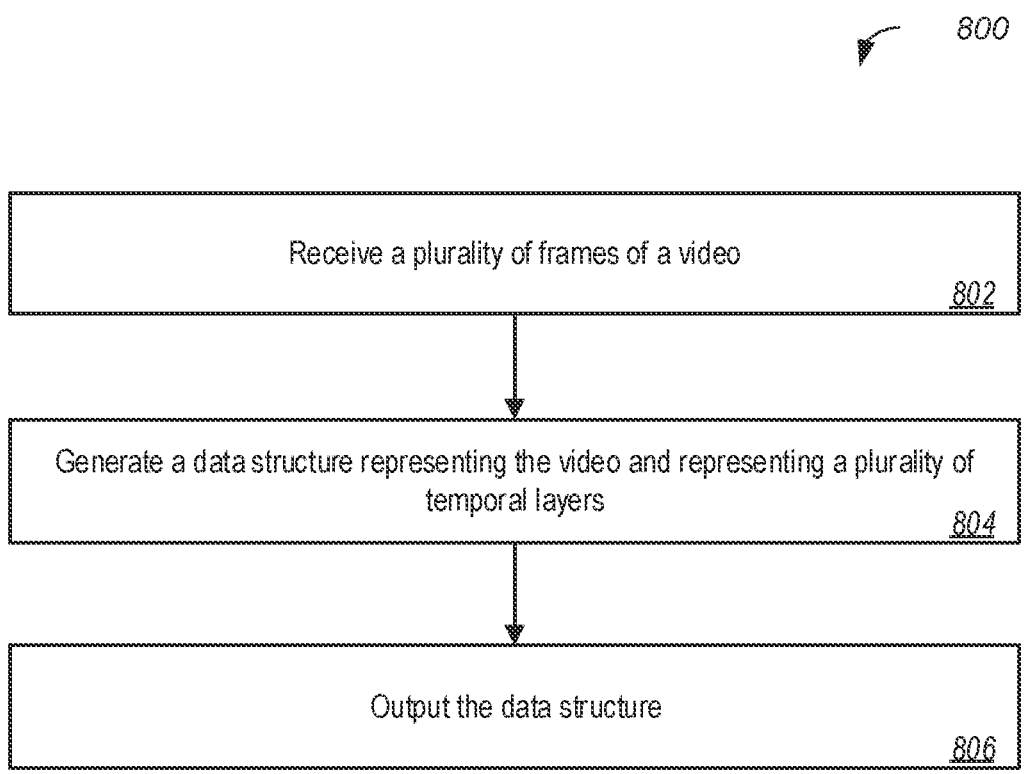
FIG. 8 is a diagram of an example process for encoding visual content.

FIG. 8 shows an example process 800 for encoding visual content. The process 800 can be performed, at least in part, using one or more devices (e.g., one or more of the computer systems shown in FIG. 9).

According to the process 800, a device receives a plurality of frames of a video (block 802).

Further, the device generates a data structure representing the video and representing a plurality of temporal layers (block 804). In some implementations, the data structure can include a group of pictures (GOP) structure. Example data structures are shown, for example, in FIGS. 3B, 4, and 5.

The device generates the data structure, at least in part, by determining a plurality of quality levels for presenting the video, where each of the quality levels corresponds to a different respective sampling period for sampling the frames of the video. Further, the device assigns, based on the sampling periods, each of the frames to a respective one of the temporal layers of the data structure, Further, the device indicates in the data structure, one or more relationships between (i) at least one the frames assigned to at least one of the temporal layers of the data structure, and (ii) at least another one of the frames assigned to at least another one of the temporal layers of the data structure.

In some implementations, assigning each of the frames to the respective one of the temporal layers of the data structure can include, for each of the frames: (i) determining an index number associated with that frame, (ii) identifying, from among the quality levels, a particular quality level from among the plurality of quality levels corresponding to a sampling period that is evenly divisible by the index number, and (iii) assigning the frame to one of the temporal layers based on the identified quality level.

In some implementations, the frame can be assigned to the temporal layer having a same index value as an index value of the identified quality level.

In some implementations, identifying the particular quality level can include (i) identifying a subset of the quality levels from among the particular of quality levels, each of the quality levels of the subset corresponding to a respective sampling period that is evenly divisible by the index number, and (ii) selecting the quality level from among the subset having the greatest sampling period.

In some implementations, the plurality of quality levels can include a first quality level corresponding to a first sampling period, and a second quality level corresponding to a second sampling period, where the first sampling period is a multiple of the second sampling period. In some implementations, the plurality of quality levels can also include a third quality level corresponding to a third sampling period, where the second sampling period is a multiple of the third sampling period.

In some implementations, the frames assigned to a first one of the temporal layers of the data structure can be encoded according to a first bitrate. Further, the frames assigned to a second one of the temporal layers of the data structure can be encoded according to a second bitrate, where the first bitrate is different from the second bitrate.

In some implementations, the frames assigned to a first one of the temporal layers of the data structure can be encoded according to a first quantization parameter. Further, the frames assigned to a second one of the temporal layers of the data structure can be encoded according to a second quantization parameter, where the first quantization parameter is different from the second quantization parameter.

Further, the device outputs the data structure (block 806). In some implementations, outputting the data structure cam include transmitting a bit stream that includes the data structure (or a portion thereof).

In some implementations, the process 800 can also include generating the video using one or more cameras of a first mobile device, and transmitting the data structure from the first mobile device to one or more second mobile devices via a communications network. Further, the video can include visual content for a communications session between the first mobile device and the one or more second mobile devices.

Example Computer System

Figure 9:
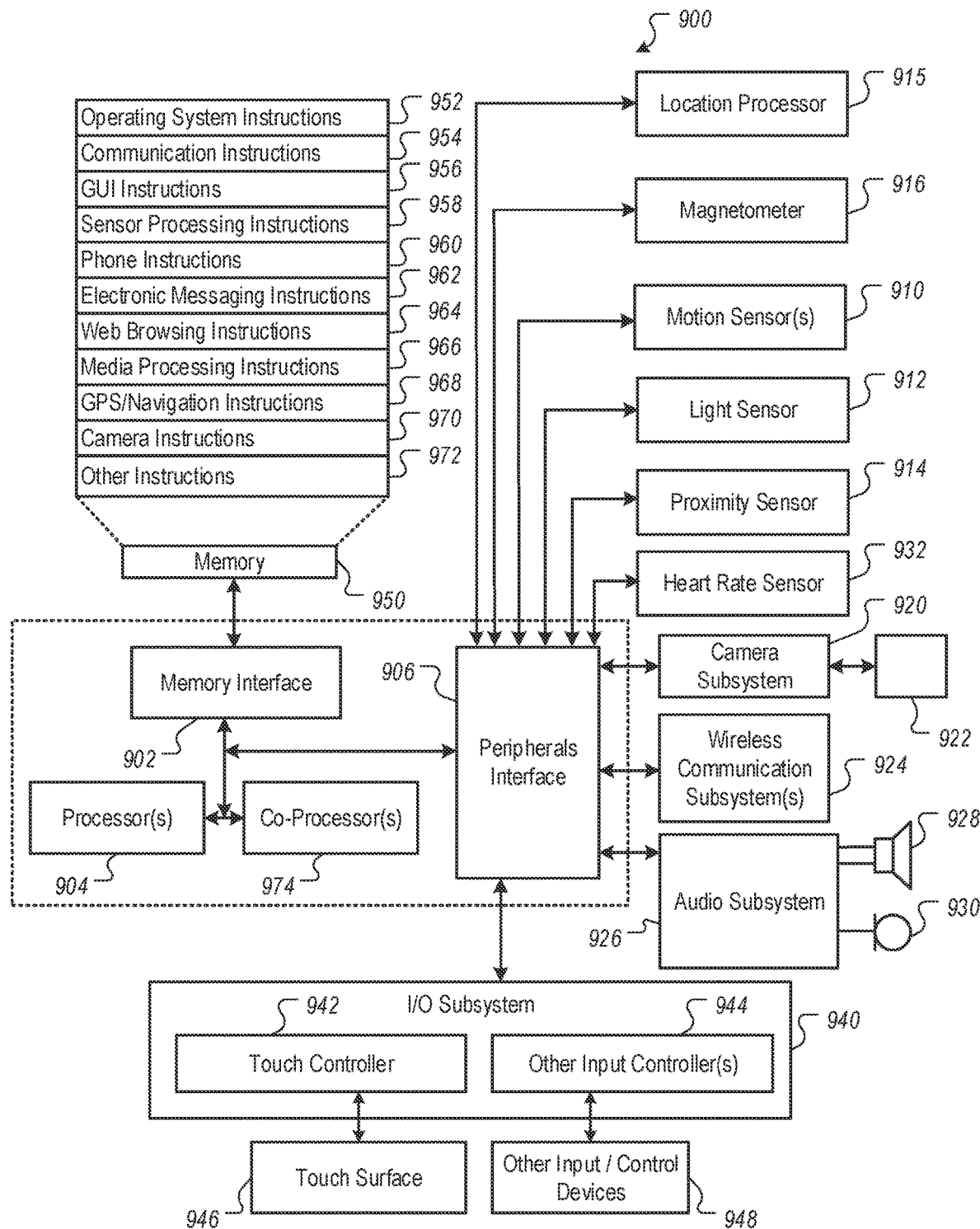
FIG. 9 is a diagram of an example device architecture for implementing the features and processes described in reference to FIGS. 1-8.

FIG. 9 is a block diagram of an example device architecture 900 for implementing the features and processes described in reference to FIGS. 1-8. For example, the architecture 900 can be used to implement the electronic device 102a-102c, the video conferencing server 104, and/or any of the components described with reference to FIG. 2. Architecture 900 may be implemented in any device for generating the features described in reference to FIGS. 1-8, including but not limited to desktop computers, server computers, portable computers, smart phones, tablet computers, game consoles, wearable computers, set top boxes, media players, smart TVs, and the like.

The architecture 900 can include a memory interface 902, one or more data processor 904, one or more data co-processors 974, and a peripherals interface 906. The memory interface 902, the processor(s) 904, the co-processor(s) 974, and/or the peripherals interface 906 can be separate components or can be integrated in one or more integrated circuits. One or more communication buses or signal lines may couple the various components.

The processor(s) 904 and/or the co-processor(s) 974 can operate in conjunction to perform the operations described herein. For instance, the processor(s) 904 can include one or more central processing units (CPUs) that are configured to function as the primary computer processors for the architecture 900. As an example, the processor(s) 904 can be configured to perform generalized data processing tasks of the architecture 900. Further, at least some of the data processing tasks can be offloaded to the co-processor(s) 974. For example, specialized data processing tasks, such as processing motion data, processing image data, encrypting data, and/or performing certain types of arithmetic operations, can be offloaded to one or more specialized co-processor(s) 974 for handling those tasks. In some cases, the processor(s) 904 can be relatively more powerful than the co-processor(s) 974 and/or can consume more power than the co-processor(s) 974. This can be useful, for example, as it enables the processor(s) 904 to handle generalized tasks quickly, while also offloading certain other tasks to co-processor(s) 974 that may perform those tasks more efficiency and/or more effectively. In some cases, a co-processor(s) can include one or more sensors or other components (e.g., as described herein), and can be configured to process data obtained using those sensors or components, and provide the processed data to the processor(s) 904 for further analysis.

Sensors, devices, and subsystems can be coupled to peripherals interface 906 to facilitate multiple functionalities. For example, a motion sensor 910, a light sensor 912, and a proximity sensor 914 can be coupled to the peripherals interface 906 to facilitate orientation, lighting, and proximity functions of the architecture 900. For example, in some implementations, a light sensor 912 can be utilized to facilitate adjusting the brightness of a touch surface 946. In some implementations, a motion sensor 910 can be utilized to detect movement and orientation of the device. For example, the motion sensor 910 can include one or more accelerometers (e.g., to measure the acceleration experienced by the motion sensor 910 and/or the architecture 900 over a period of time), and/or one or more compasses or gyros (e.g., to measure the orientation of the motion sensor 910 and/or the mobile device). In some cases, the measurement information obtained by the motion sensor 910 can be in the form of one or more a time-varying signals (e.g., a time-varying plot of an acceleration and/or an orientation over a period of time). Further, display objects or media may be presented according to a detected orientation (e.g., according to a "portrait" orientation or a "landscape" orientation). In some cases, a motion sensor 910 can be directly integrated into a co-processor 974 configured to processes measurements obtained by the motion sensor 910. For example, a co-processor 974 can include one more accelerometers, compasses, and/or gyroscopes, and can be configured to obtain sensor data from each of these sensors, process the sensor data, and transmit the processed data to the processor(s) 904 for further analysis.

Other sensors may also be connected to the peripherals interface 906, such as a temperature sensor, a biometric sensor, or other sensing device, to facilitate related functionalities. As an example, as shown in FIG. 9, the architecture 900 can include a heart rate sensor 932 that measures the beats of a user's heart. Similarly, these other sensors also can be directly integrated into one or more co-processor(s) 974 configured to process measurements obtained from those sensors.

A location processor 915 (e.g., a GNSS receiver chip) can be connected to the peripherals interface 906 to provide geo-referencing. An electronic magnetometer 916 (e.g., an integrated circuit chip) can also be connected to the peripherals interface 906 to provide data that may be used to determine the direction of magnetic North. Thus, the electronic magnetometer 916 can be used as an electronic compass.

A camera subsystem 920 and an optical sensor 922 (e.g., a charged coupled device [CCD] or a complementary metal-oxide semiconductor [CMOS] optical sensor) can be utilized to facilitate camera functions, such as recording photographs and video clips.

Communication functions may be facilitated through one or more communication subsystems 924. The communication subsystem(s) 924 can include one or more wireless and/or wired communication subsystems. For example, wireless communication subsystems can include radio frequency receivers and transmitters and/or optical (e.g., infrared) receivers and transmitters. As another example, wired communication system can include a port device, e.g., a Universal Serial Bus (USB) port or some other wired port connection that can be used to establish a wired connection to other computing devices, such as other communication devices, network access devices, a personal computer, a printer, a display screen, or other processing devices capable of receiving or transmitting data.

The specific design and implementation of the communication subsystem 924 can depend on the communication network(s) or medium(s) over which the architecture 900 is intended to operate. For example, the architecture 900 can include wireless communication subsystems designed to operate over a global system for mobile communications (GSM) network, a GPRS network, an enhanced data GSM environment (EDGE) network, 802.x communication networks (e.g., Wi-Fi, Wi-Max), code division multiple access (CDMA) networks, NFC and a Bluetooth™ network. The wireless communication subsystems can also include hosting protocols such that the architecture 900 can be configured as a base station for other wireless devices. As another example, the communication subsystems may allow the architecture 900 to synchronize with a host device using one or more protocols, such as, for example, the TCP/IP protocol, HTTP protocol, UDP protocol, and any other known protocol.

An audio subsystem 926 can be coupled to a speaker 928 and one or more microphones 930 to facilitate voice-enabled functions, such as voice recognition, voice replication, digital recording, and telephony functions.

An I/O subsystem 940 can include a touch controller 942 and/or other input controller(s) 944. The touch controller 942 can be coupled to a touch surface 946. The touch surface 946 and the touch controller 942 can, for example, detect contact and movement or break thereof using any of a number of touch sensitivity technologies, including but not limited to capacitive, resistive, infrared, and surface acoustic wave technologies, as well as other proximity sensor arrays or other elements for determining one or more points of contact with the touch surface 946. In one implementations, the touch surface 946 can display virtual or soft buttons and a virtual keyboard, which can be used as an input/output device by the user.

Other input controller(s) 944 can be coupled to other input/control devices 948, such as one or more buttons, rocker switches, thumb-wheel, infrared port, USB port, and/or a pointer device such as a stylus. The one or more buttons (not shown) can include an up/down button for volume control of the speaker 928 and/or the microphone 930.

In some implementations, the architecture 900 can present recorded audio and/or video files, such as MP3, AAC, and MPEG video files. In some implementations, the architecture 900 can include the functionality of an MP3 player and may include a pin connector for tethering to other devices. Other input/output and control devices may be used.

A memory interface 902 can be coupled to a memory 950. The memory 950 can include high-speed random access memory or non-volatile memory, such as one or more magnetic disk storage devices, one or more optical storage devices, or flash memory (e.g., NAND, NOR). The memory 950 can store an operating system 952, such as Darwin, RTXC, LINUX, UNIX, OS X, WINDOWS, or an embedded operating system such as VxWorks. The operating system 952 can include instructions for handling basic system services and for performing hardware dependent tasks. In some implementations, the operating system 952 can include a kernel (e.g., UNIX kernel).

The memory 950 can also store communication instructions 954 to facilitate communicating with one or more additional devices, one or more computers or servers, including peer-to-peer communications. The communication instructions 954 can also be used to select an operational mode or communication medium for use by the device, based on a geographic location (obtained by the GPS/Navigation instructions 968) of the device. The memory 950 can include graphical user interface instructions 956 to facilitate graphic user interface processing, including a touch model for interpreting touch inputs and gestures; sensor processing instructions 958 to facilitate sensor-related processing and functions; phone instructions 960 to facilitate phone-related processes and functions; electronic messaging instructions 962 to facilitate electronic-messaging related processes and functions; web browsing instructions 964 to facilitate web browsing-related processes and functions; media processing instructions 966 to facilitate media processing-related processes and functions; GPS/Navigation instructions 969 to facilitate GPS and navigation-related processes; camera instructions 970 to facilitate camera-related processes and functions; and other instructions 972 for performing some or all of the processes described herein.

Each of the above identified instructions and applications can correspond to a set of instructions for performing one or more functions described herein. These instructions need not be implemented as separate software programs, procedures, or modules. The memory 950 can include additional instructions or fewer instructions. Furthermore, various functions of the device may be implemented in hardware and/or in software, including in one or more signal processing and/or application specific integrated circuits (ASICs).

The features described may be implemented in digital electronic circuitry or in computer hardware, firmware, software, or in combinations of them. The features may be implemented in a computer program product tangibly embodied in an information carrier, e.g., in a machine-readable storage device, for execution by a programmable processor; and method steps may be performed by a programmable processor executing a program of instructions to perform functions of the described implementations by operating on input data and generating output.

The described features may be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer may communicate with mass storage devices for storing data files. These mass storage devices may include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user the features may be implemented on a computer having a display device such as a CRT (cathode ray tube) or LCD (liquid crystal display) monitor for displaying information to the author and a keyboard and a pointing device such as a mouse or a trackball by which the author may provide input to the computer.

The features may be implemented in a computer system that includes a back-end component, such as a data server or that includes a middleware component, such as an application server or an Internet server, or that includes a front-end component, such as a client computer having a graphical user interface or an Internet browser, or any combination of them. The components of the system may be connected by any form or medium of digital data communication such as a communication network. Examples of communication networks include a LAN, a WAN and the computers and networks forming the Internet.

The computer system may include clients and servers. A client and server are generally remote from each other and typically interact through a network. The relationship of client and server arises by virtue of computer programs running on the respective computers and having a client-server relationship to each other.

One or more features or steps of the disclosed embodiments may be implemented using an Application Programming Interface (API). An API may define on or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

A number of implementations have been described. Nevertheless, it will be understood that various modifications may be made. Elements of one or more implementations may be combined, deleted, modified, or supplemented to form further implementations. As yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method comprising:
    receiving, by one or more processors, a plurality of frames of a video;
    generating, by the one or more processors, a data structure representing the video, wherein the data structure represents a plurality of temporal layers, and wherein generating the data structure comprises:

determining a plurality of quality levels for presenting the video, wherein each of the quality levels corresponds to a different respective sampling period for sampling the frames of the video, assigning, based on the sampling periods, each of the frames to a respective one of the temporal layers of the data structure, wherein assigning each of the frames to the respective one of the temporal layers of the data structure comprises, for each of the frames:

determining an index number associated with that frame, identifying, from among the quality levels, a particular quality level from among the plurality of quality levels corresponding to a sampling period that is evenly divisible by the index number, and assigning the frame to one of the temporal layers based on the identified quality level, and indicating, in the data structure, one or more relationships between (i) at least one the frames assigned to at least one of the temporal layers of the data structure, and (ii) at least another one of the frames assigned to at least another one of the temporal layers of the data structure; and outputting, by the one or more processors, the data structure.

2. The method of claim 1, wherein the data structure comprises a group of pictures (GOP) structure.

3. The method of claim 1, wherein outputting the data structure comprises transmitting a bit stream comprising the data structure.

4. The method of claim 1, further comprising:
generating the video using one or more cameras of a first mobile device, and
transmitting the data structure from the first mobile device to one or more second mobile devices via a communications network.

5. The method of claim 4, wherein the video comprises visual content for a communications session between the first mobile device and the one or more second mobile devices.

6. The method of claim 1, wherein the frame is assigned to the temporal layer having a same index value as an index value of the identified quality level.

7. The method of claim 1, wherein identifying the particular quality level comprises:
identifying a subset of the quality levels from among the plurality of quality levels, each of the quality levels of the subset corresponding to a respective sampling period that is evenly divisible by the index number, and
selecting the quality level from among the subset having the greatest sampling period.

8. The method of claim 1, wherein the plurality of quality levels comprises:
a first quality level corresponding to a first sampling period, and
a second quality level corresponding to a second sampling period,
wherein the first sampling period is a multiple of the second sampling period.

9. The method of claim 8, wherein the plurality of quality levels further comprises a third quality level corresponding to a third sampling period, wherein the second sampling period is a multiple of the third sampling period.

10. The method of claim 1, further comprising:
encoding the frames assigned to a first one of the temporal layers of the data structure according to a first bitrate, and
encoding the frames assigned to a second one of the temporal layers of the data structure according to a second bitrate,
wherein the first bitrate is different from the second bitrate.

11. The method of claim 1, further comprising:
encoding the frames assigned to a first one of the temporal layers of the data structure according to a first quantization parameter, and
encoding the frames assigned to a second one of the temporal layers of the data structure according to a second quantization parameter,
wherein the first quantization parameter is different from the second quantization parameter.

12. A system comprising:
one or more processors; and
memory storing instructions that when executed by the one or more processors, cause the one or more processors to perform operations comprising:
receiving a plurality of frames of a video;
generating a data structure representing the video, wherein the data structure represents a plurality of temporal layers, and wherein generating the data structure comprises:
determining a plurality of quality levels for presenting the video, wherein each of the quality levels corresponds to a different respective sampling period for sampling the frames of the video,
assigning, based on the sampling periods, each of the frames to a respective one of the temporal layers of the data structure, wherein assigning each of the frames to the respective one of the temporal layers of the data structure comprises, for each of the frames:
determining an index number associated with that frame,
identifying, from among the quality levels, a particular quality level from among the plurality of quality levels corresponding to a sampling period that is evenly divisible by the index number, and
assigning the frame to one of the temporal layers based on the identified quality level, and
indicating, in the data structure, one or more relationships between (i) at least one the frames assigned to at least one of the temporal layers of the data structure, and (ii) at least another one of the frames assigned to at least another one of the temporal layers of the data structure; and
outputting the data structure.

13. The system of claim 12, wherein the data structure comprises a group of pictures (GOP) structure.

14. The system of claim 12, wherein outputting the data structure comprises transmitting a bit stream comprising the data structure.

15. The system of claim 12, the operations further comprising:
generating the video using one or more cameras of a first mobile device, and
transmitting the data structure from the first mobile device to one or more second mobile devices via a communications network.

16. The system of claim 15, wherein the video comprises visual content for a communications session between the first mobile device and the one or more second mobile devices.

17. The system of claim 12, wherein the frame is assigned to the temporal layer having a same index value as an index value of the identified quality level.

18. The system of claim 12, wherein identifying the particular quality level comprises:
identifying a subset of the quality levels from among the plurality of quality levels, each of the quality levels of the subset corresponding to a respective sampling period that is evenly divisible by the index number, and
selecting the quality level from among the subset having the greatest sampling period.

19. The system of claim 12, wherein the plurality of quality levels comprises:
a first quality level corresponding to a first sampling period, and
a second quality level corresponding to a second sampling period,
wherein the first sampling period is a multiple of the second sampling period.

20. The system of claim 19, wherein the plurality of quality levels further comprises a third quality level corresponding to a third sampling period, wherein the second sampling period is a multiple of the third sampling period.

21. The system of claim 12, the operations further comprising:
encoding the frames assigned to a first one of the temporal layers of the data structure according to a first bitrate, and
encoding the frames assigned to a second one of the temporal layers of the data structure according to a second bitrate,
wherein the first bitrate is different from the second bitrate.

22. The system of claim 12, the operations further comprising:
encoding the frames assigned to a first one of the temporal layers of the data structure according to a first quantization parameter, and
encoding the frames assigned to a second one of the temporal layers of the data structure according to a second quantization parameter,
wherein the first quantization parameter is different from the second quantization parameter.

23. One or more non-transitory, computer-readable storage media having instructions stored thereon, that when executed by one or more processors, cause the one or more processors to perform operations comprising:
receiving a plurality of frames of a video;
generating a data structure representing the video, wherein the data structure represents a plurality of temporal layers, and wherein generating the data structure comprises:
determining a plurality of quality levels for presenting the video, wherein each of the quality levels corresponds to a different respective sampling period for sampling the frames of the video,
assigning, based on the sampling periods, each of the frames to a respective one of the temporal layers of the data structure, wherein assigning each of the frames to the respective one of the temporal layers of the data structure comprises, for each of the frames:
determining an index number associated with that frame,
identifying, from among the quality levels, a particular quality level from among the plurality of quality levels corresponding to a sampling period that is evenly divisible by the index number, and
indicating, in the data structure, one or more relationships between (i) at least one the frames assigned to at least one of the temporal layers of the data structure, and (ii) at least another one of the frames assigned to at least another one of the temporal layers of the data structure; and
outputting the data structure.

24. The one or more non-transitory, computer-readable storage media of claim 23, wherein the data structure comprises a group of pictures (GOP) structure.

25. The one or more non-transitory, computer-readable storage media of claim 23, wherein outputting the data structure comprises transmitting a bit stream comprising the data structure.

26. The one or more non-transitory, computer-readable storage media of claim 23, the operations further comprising:
generating the video using one or more cameras of a first mobile device, and
transmitting the data structure from the first mobile device to one or more second mobile devices via a communications network.

27. The one or more non-transitory, computer-readable storage media of claim 26, wherein the video comprises visual content for a communications session between the first mobile device and the one or more second mobile devices.

28. The one or more non-transitory, computer-readable storage media of claim 23, wherein the frame is assigned to the temporal layer having a same index value as an index value of the identified quality level.

29. The one or more non-transitory, computer-readable storage media of claim 23, wherein identifying the particular quality level comprises:
identifying a subset of the quality levels from among the particular plurality of quality levels, each of the quality levels of the subset corresponding to a respective sampling period that is evenly divisible by the index number, and
selecting the quality level from among the subset having the greatest sampling period.

30. The one or more non-transitory, computer-readable storage media of claim 23, wherein the plurality of quality levels comprises:
a first quality level corresponding to a first sampling period, and
a second quality level corresponding to a second sampling period,
wherein the first sampling period is a multiple of the second sampling period.

31. The one or more non-transitory, computer-readable storage media of claim 30, wherein the plurality of quality levels further comprises a third quality level corresponding to a third sampling period, wherein the second sampling period is a multiple of the third sampling period.

32. The one or more non-transitory, computer-readable storage media of claim 23, the operations further comprising:
encoding the frames assigned to a first one of the temporal layers of the data structure according to a first bitrate, and
encoding the frames assigned to a second one of the temporal layers of the data structure according to a second bitrate,
wherein the first bitrate is different from the second bitrate.

33. The one or more non-transitory, computer-readable storage media of claim 23, the operations further comprising:
- encoding the frames assigned to a first one of the temporal layers of the data structure according to a first quantization parameter, and
- encoding the frames assigned to a second one of the temporal layers of the data structure according to a second quantization parameter,
- wherein the first quantization parameter is different from the second quantization parameter.

* * * * *

UNITED STATES PATENT AND TRADEMARK OFFICE
CERTIFICATE OF CORRECTION

| | |
|---|---|
| PATENT NO. | : 11,677,934 B2 |
| APPLICATION NO. | : 17/485298 |
| DATED | : June 13, 2023 |
| INVENTOR(S) | : Sudeng Hu et al. |

It is certified that error appears in the above-identified patent and that said Letters Patent is hereby corrected as shown below:

On the Title Page

Column 2 Item (57) (abstract), Line 11, after "one" insert -- of --;

In the Claims

Column 25, Line 19, In Claim 1, after "one" insert -- of --;

Column 26, Line 46, In Claim 12, after "one" insert -- of --;

Column 28, Line 2, In Claim 23, after "one" insert -- of --; and

Column 28, Line 37, In Claim 29, before "plurality" delete "particular".

Signed and Sealed this
Twenty-fourth Day of October, 2023

Katherine Kelly Vidal
*Director of the United States Patent and Trademark Office*